United States Patent
Yamada et al.

(10) Patent No.: US 9,004,437 B2
(45) Date of Patent: Apr. 14, 2015

(54) VIBRATION PROOF STRUCTURE OF SEAT APPARATUS FOR VEHICLE

(71) Applicant: Aisin Seiki Kabushiki Kaisha, Kariya-shi (JP)

(72) Inventors: Yukifumi Yamada, Toyota (JP); Naoki Goto, Tokai (JP)

(73) Assignee: Aisin Seiki Kabushiki Kaisha, Kariya-shi (JP)

(*) Notice: Subject to any disclaimer, the term of this patent is extended or adjusted under 35 U.S.C. 154(b) by 58 days.

(21) Appl. No.: 13/911,210

(22) Filed: Jun. 6, 2013

(65) Prior Publication Data
US 2013/0341484 A1 Dec. 26, 2013

(30) Foreign Application Priority Data
Jun. 21, 2012 (JP) .................. 2012-140218

(51) Int. Cl.
*F16M 13/00* (2006.01)
*B60N 2/68* (2006.01)
*B60N 2/07* (2006.01)
*B60N 2/08* (2006.01)
*B60N 2/22* (2006.01)
*B60N 2/44* (2006.01)

(52) U.S. Cl.
CPC *B60N 2/68* (2013.01); *B60N 2/682* (2013.01); *B60N 2/0705* (2013.01); *B60N 2/0732* (2013.01); *B60N 2/0818* (2013.01); *B60N 2/0875* (2013.01); *B60N 2/22* (2013.01); *B60N 2/0837* (2013.01); *B60N 2/44* (2013.01)

(58) Field of Classification Search
CPC .......... B60N 2/42; B60N 2/44; B60N 2/4207; B60N 2/062; B60N 2/06; B60N 2/07

USPC .............. 248/424, 429; 297/311, 331, 344.1, 297/344.13; 296/65.01, 65.13, 65.02, 65.15
See application file for complete search history.

(56) References Cited

U.S. PATENT DOCUMENTS

| 5,104,084 | A  | * | 4/1992  | Kumagai et al. | ............ | 248/430 |
| 6,616,230 | B2 | * | 9/2003  | Niikura        | ................. | 297/311 |
| 8,104,832 | B2 | * | 1/2012  | Fujita et al.  | ................. | 297/217.2 |
| 8,833,849 | B2 | * | 9/2014  | Ishimoto et al.| .............. | 297/216.1 |
| 2011/0006580 | A1 | | 1/2011 | Ishimoto et al.| | |

FOREIGN PATENT DOCUMENTS

| JP | 2011-510863 | 4/2011 |
| JP | 2011-235727 | 11/2011 |

* cited by examiner

Primary Examiner — Todd M Epps
(74) Attorney, Agent, or Firm — Oblon, McClelland, Maier & Neustadt, L.L.P.

(57) ABSTRACT

A vibration proof structure of a seat apparatus for a vehicle, includes a first member and a second member movably arranged relative to each other in a first relative direction corresponding to a forward movement of a seat element in a front and rear direction of the vehicle and in a second relative direction corresponding to a rearward movement of the seat element in the front and rear direction, a first restriction wall restricting a relative movement of the first member to the second member in the first relative direction, a second restriction wall restricting the relative movement of the first member to the second member in the second relative direction, and a resistance force applying portion applying a resistance force to the first member moving in the first relative direction while not applying the resistance force to the first member moving in the second relative direction.

7 Claims, 13 Drawing Sheets

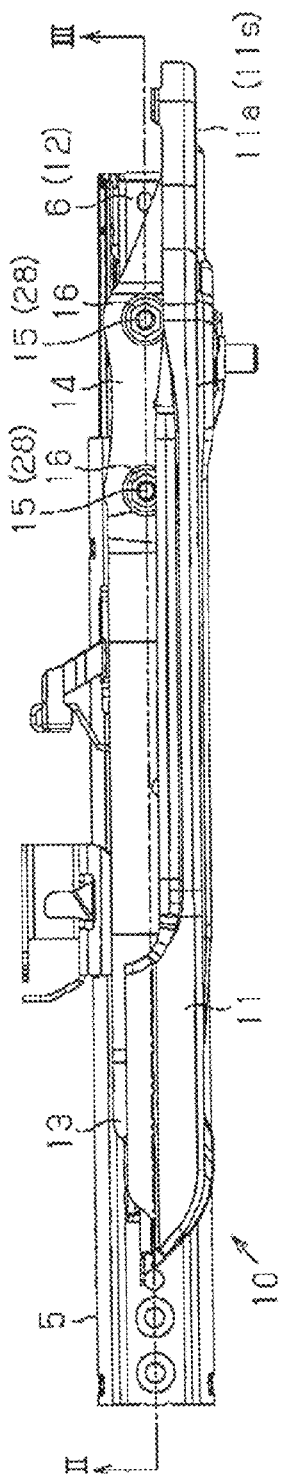
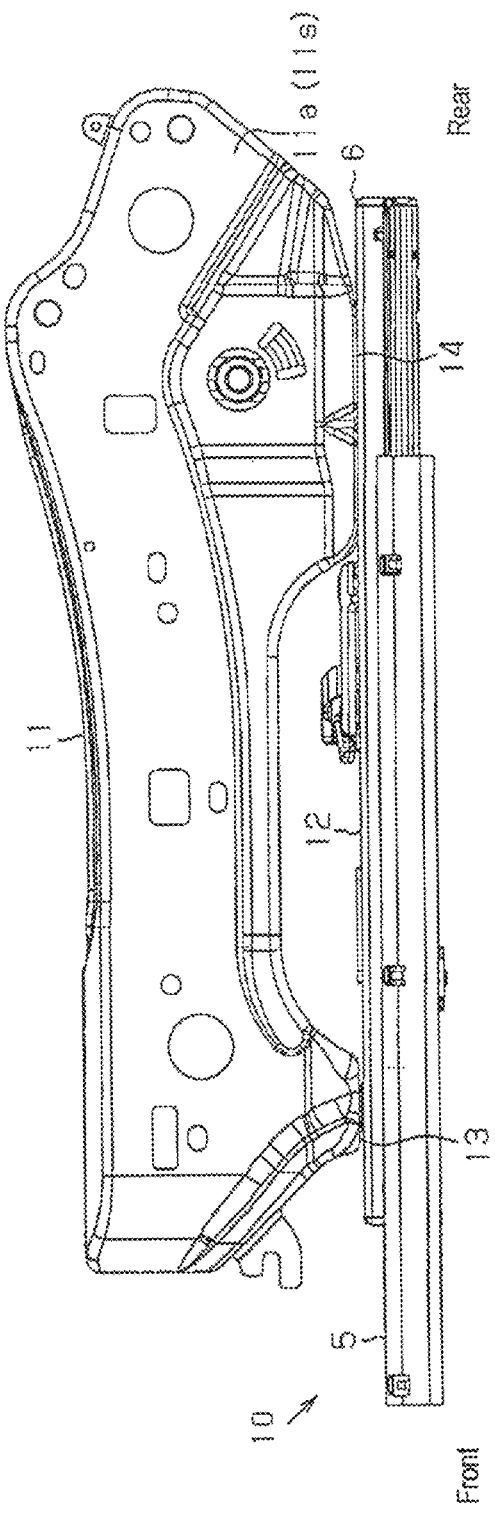
FIG. 2A
FIG. 2B

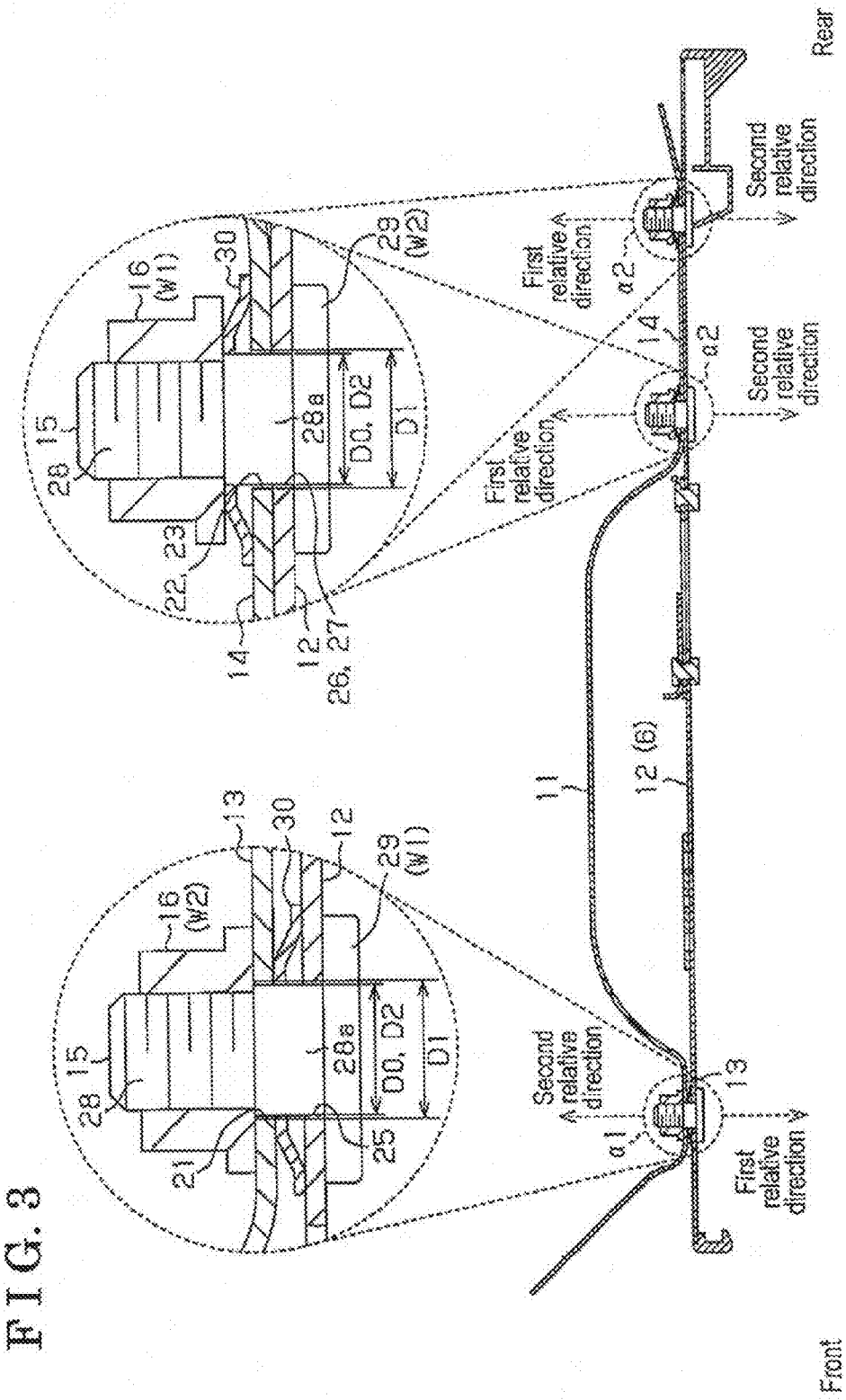

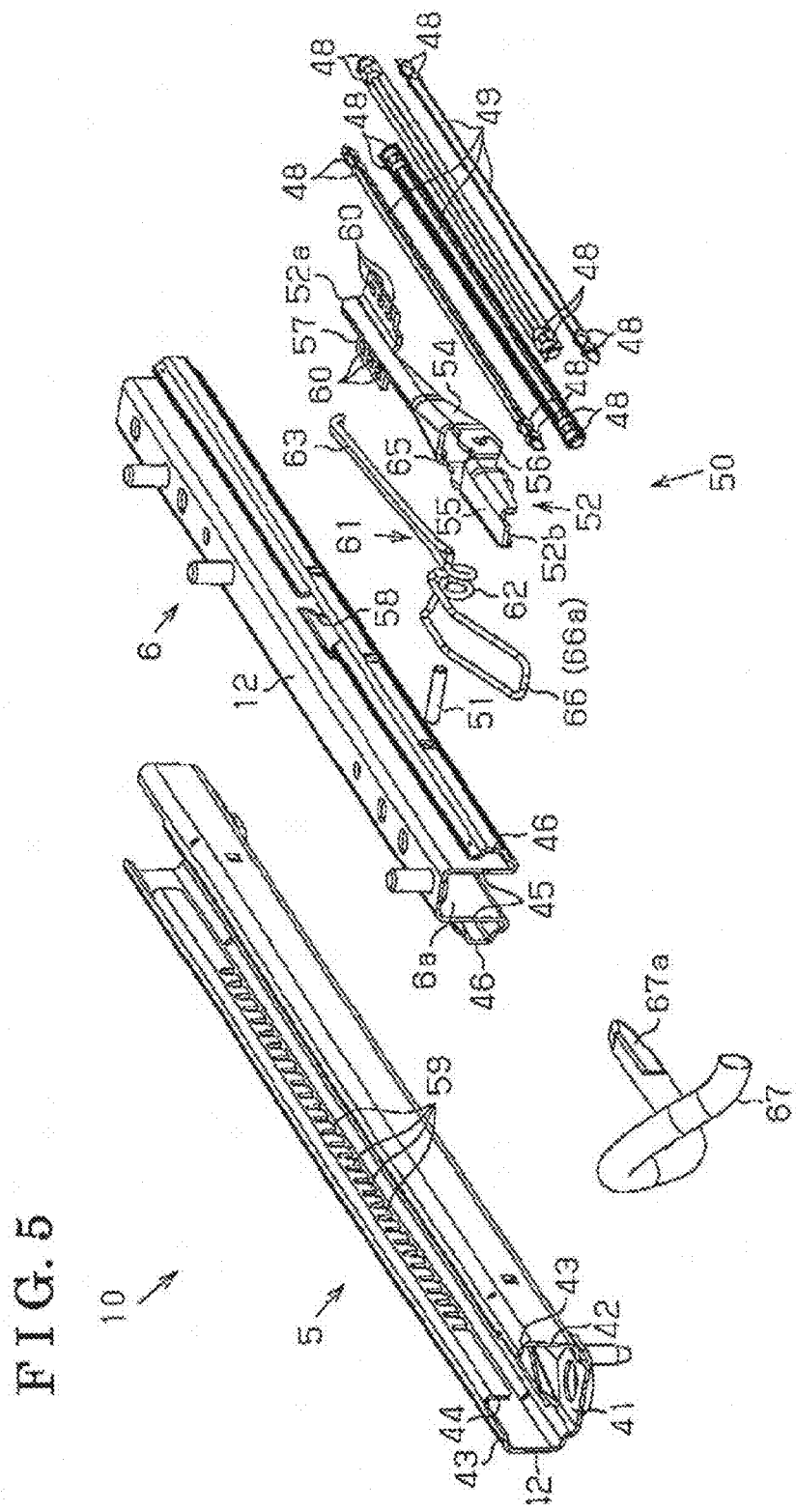

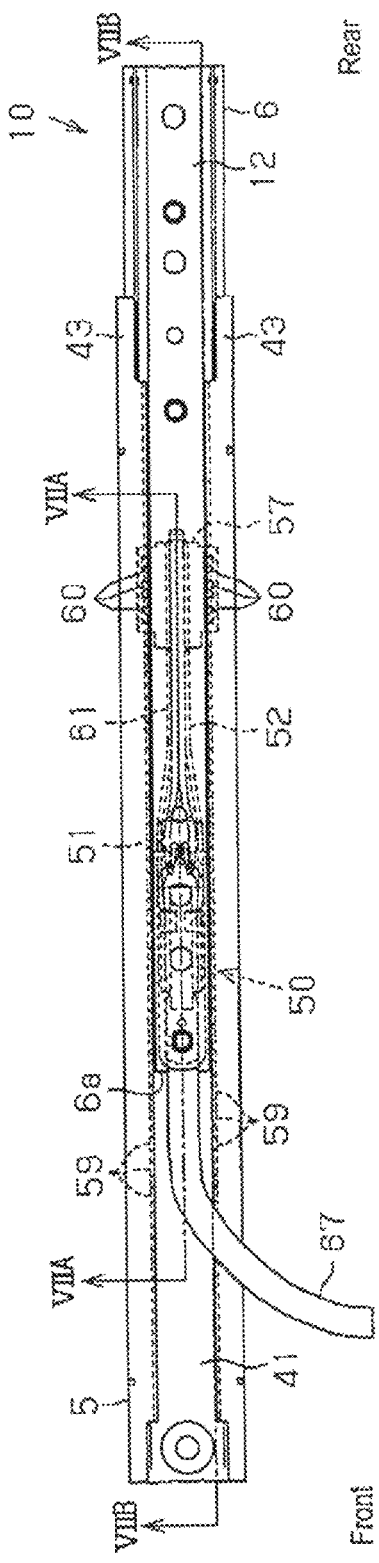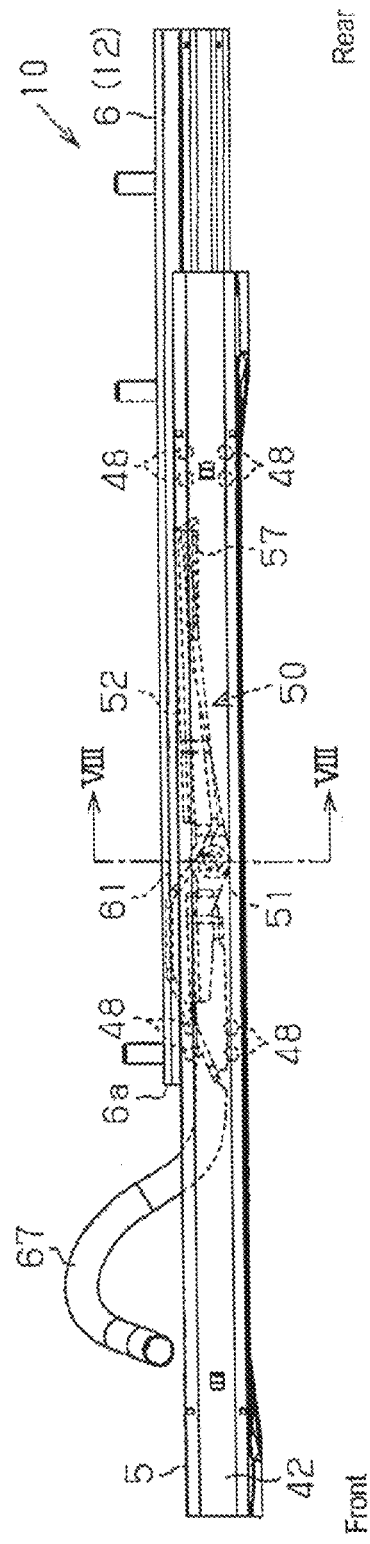

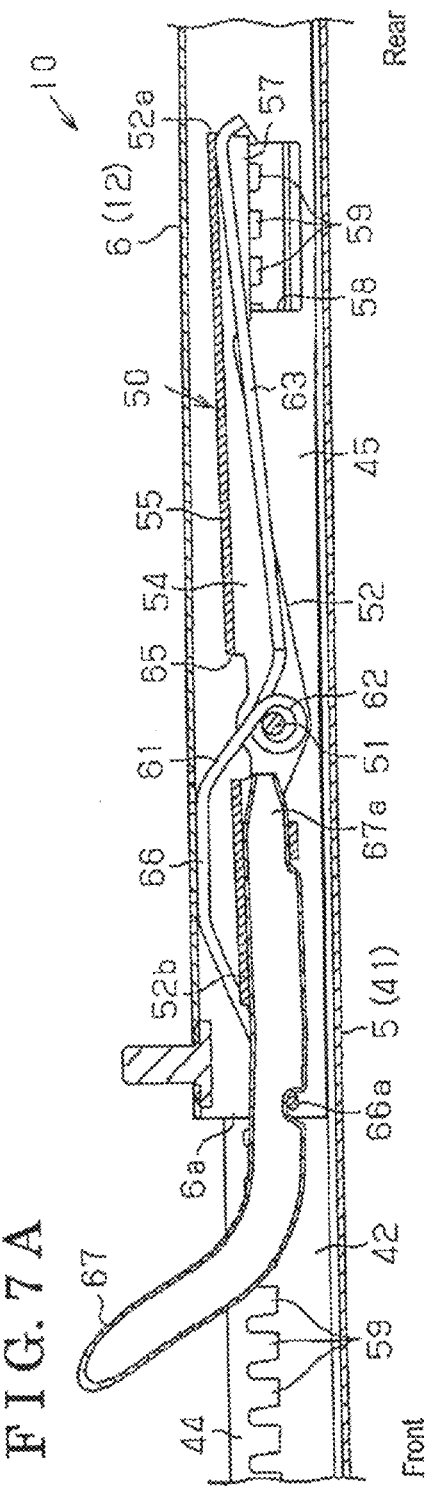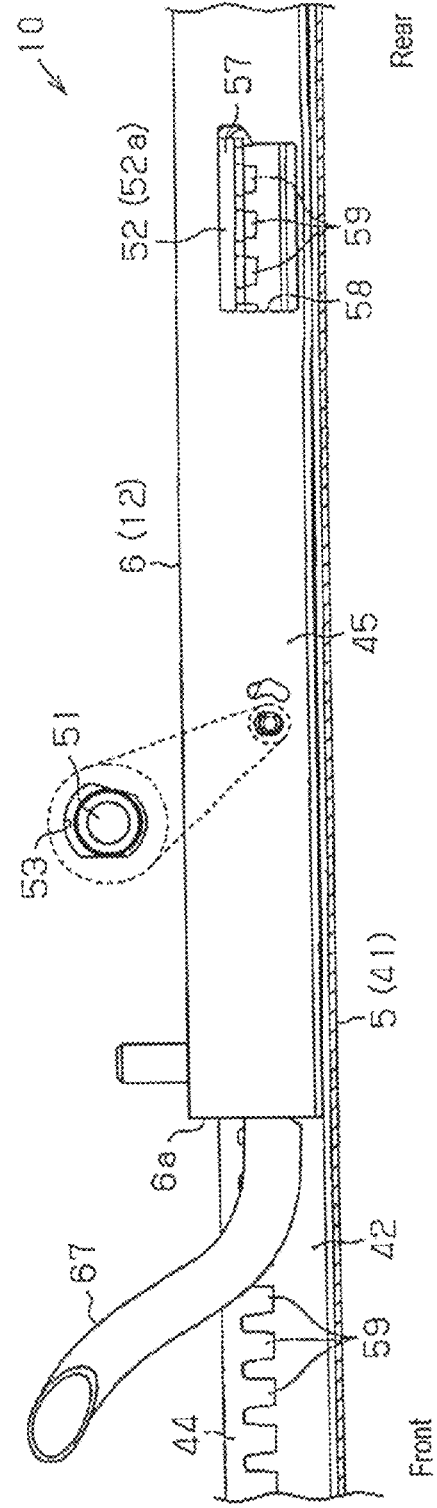

F I G. 14
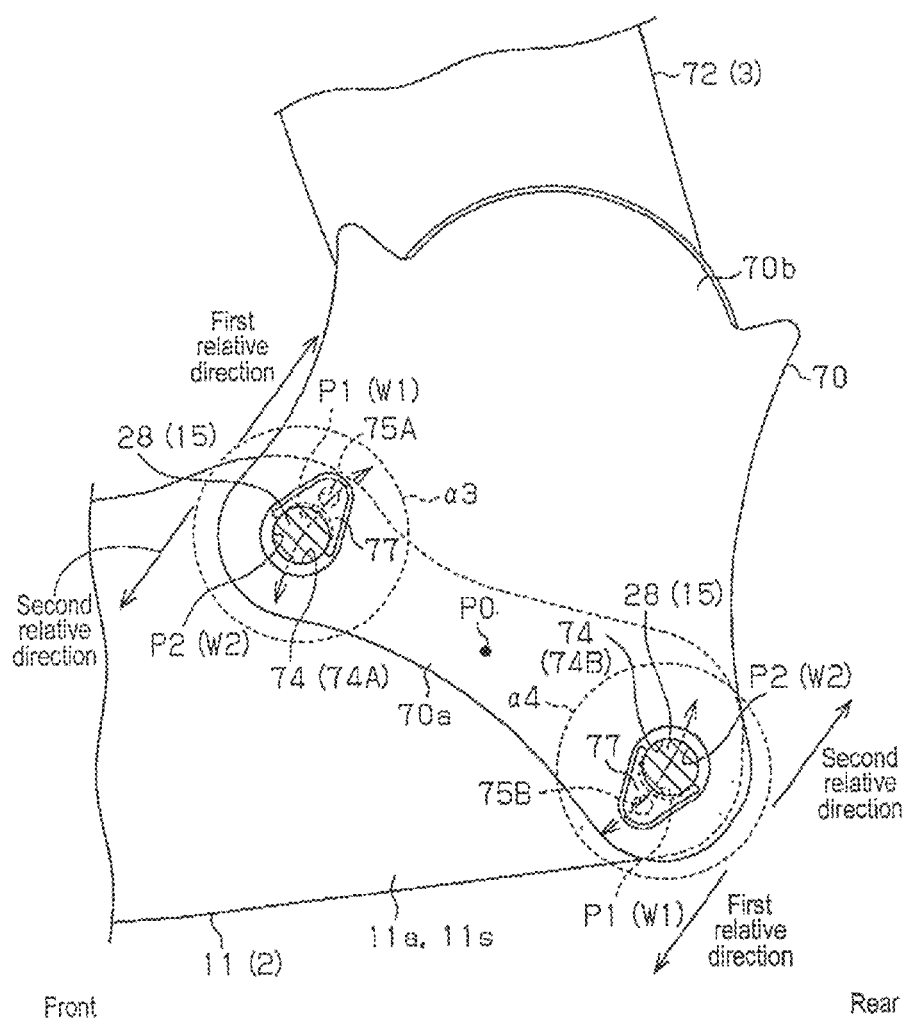

US 9,004,437 B2

VIBRATION PROOF STRUCTURE OF SEAT APPARATUS FOR VEHICLE

CROSS REFERENCE TO RELATED APPLICATIONS

This application is based on and claims priority under 35 U.S.C. §119 to Japanese Patent Application 2012-140218, filed on Jun. 21, 2012, the entire content of which is incorporated herein by reference.

TECHNICAL FIELD

This disclosure generally relates to a vibration proof structure of a seat apparatus for a vehicle.

BACKGROUND DISCUSSION

Known vibration proof structures of seat apparatuses (seats) for vehicles are disclosed, for example, in JP2011-235727A and JP2011-510863A (which will be hereinafter referred to as References 1 and 2). In particular, the vibration structure according to Reference 1 is an inner and outer double structure in which a lower end portion of a side frame of a seat back is configured so that an inner frame is arranged at an interior side of an outer frame. In addition, an elastic member is provided between the inner frame and the outer frame. Further, according to Reference 2, the seat includes sub-frames (side frames) of a seat back and a rod connecting the side frames to each other. Reference 2 discloses a structure in which an elastic member is provided between the rod and one of the side frames. In both References 1 and 2, an energy generated by a movement of a seat element (for example, the seat back, a seat cushion, and the like) supported to be arranged at an upper side of the seat is reduced by the elastic member arranged between components of the seat; thereby, vibrations generated at the seat may be reduced or absorbed.

As described above, according to the vibration structures of References 1 and 2, the elastic member is arranged between the components of the seat; therefore, rigidity of the seat may deteriorate. In particular, according to the vibration proof structure of Reference 2, the elastic member is provided between one end portion of the rod and the side frame; thereby, the deterioration of the rigidity of the seat is restricted. In fact, the seat requires the highest rigidity for a rear side thereof; however, in this point, the vibration proof structure disclosed in Reference 2 may not ensure the high rigidity for the rear side of the seat.

A need thus exists for a vibration proof structure of a seat apparatus for a vehicle, which is not susceptible to the drawback mentioned above.

SUMMARY

According to an aspect of this disclosure, a vibration proof structure of a seat apparatus for a vehicle, includes a first member and a second member movably arranged relative to each other in a first relative direction corresponding to a forward movement of a seat element in a front and rear direction of the vehicle and in a second relative direction corresponding to a rearward movement of the seat element in the front and rear direction of the vehicle, the seat element being supported at an upper side of the seat apparatus, a first restriction wall restricting a relative movement of the first member to the second member in the first relative direction, a second restriction wall restricting the relative movement of the first member to the second member in the second relative direction, and a resistance force applying portion applying a resistance force to the first member moving in the first relative direction between the first restriction wall and the second restriction wall while not applying the resistance force to the first member moving in the second relative direction between the first restriction wall and the second restriction wall.

BRIEF DESCRIPTION OF THE DRAWINGS

The foregoing and additional features and characteristics of this disclosure will become more apparent from the following detailed description considered with the reference to the accompanying drawings, wherein:

FIG. 2A is a plan view illustrating a seat slide mechanism and a side frame according to the first embodiment disclosed here;

FIG. 2B is a side view illustrating the seat slide mechanism and the side frame according to the first embodiment disclosed here;

FIG. 3 is a cross sectional view taken along the line III-III in FIG. 2A and illustrating a fixing structure between an upper rail and the side frame according to the first embodiment disclosed here;

FIG. 5 is an exploded perspective view illustrating the seat slide mechanism and a lock mechanism according to the second embodiment disclosed here;

FIG. 6A is a plan view of the seat slide mechanism according to the second embodiment disclosed here;

FIG. 6B is a side view of the seat slide mechanism according to the second embodiment disclosed here;

FIG. 7A is a cross sectional view taken along the line VIIA-VIIA in FIG. 6A and illustrating the seat slide mechanism and the lock mechanism according to the second embodiment disclosed here;

FIG. 7B is a cross sectional view taken along the line VIIB-VIIB in FIG. 6A and illustrating the seat slide mechanism and the lock mechanism according to the second embodiment disclosed here;

FIG. 14 is an explanatory drawing illustrating a function of a vibration proof structure according to the third embodiment.

DETAILED DESCRIPTION

Figure 1:
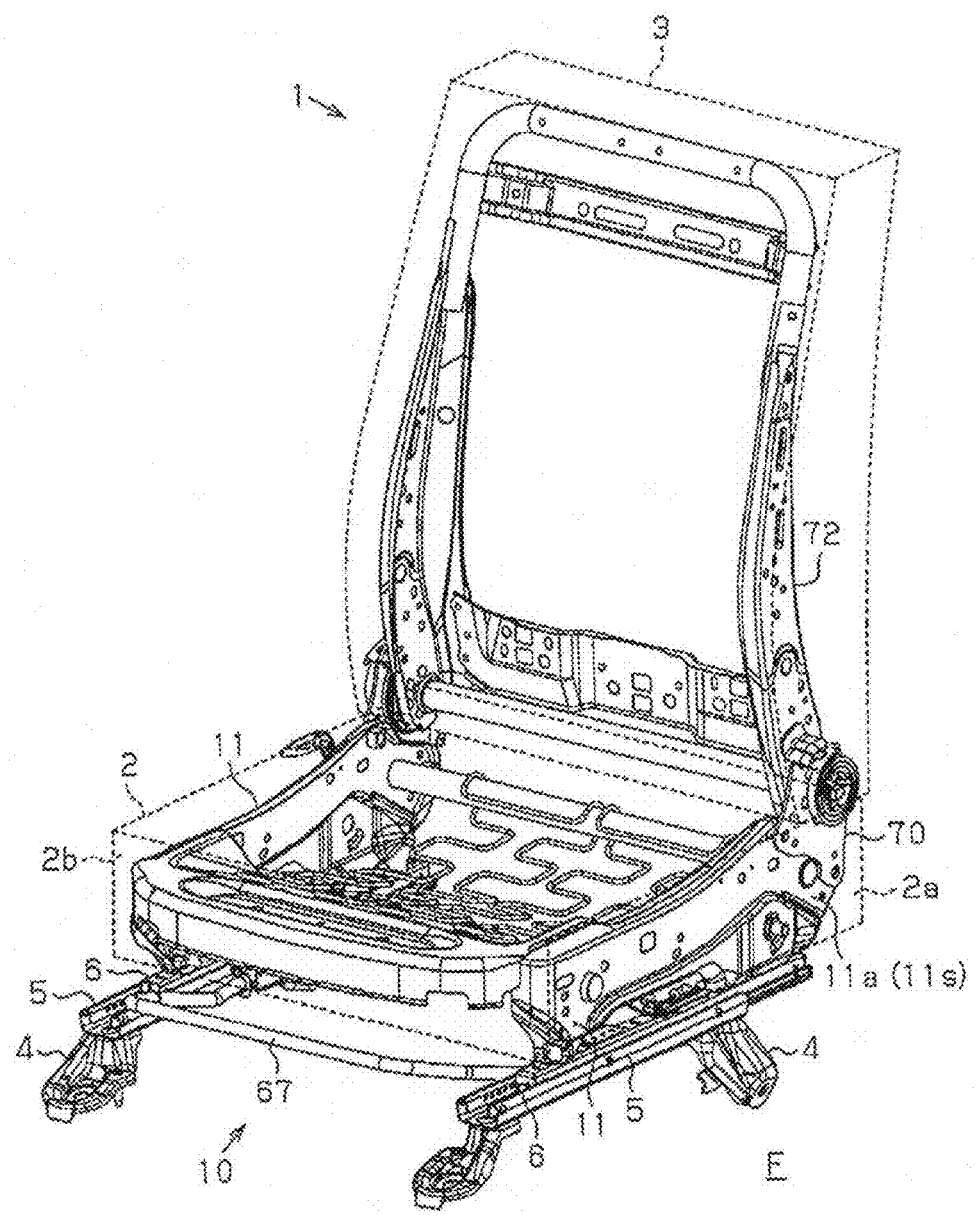
FIG. 1 is a perspective view of a seat (a seat apparatus) for a vehicle according to a first embodiment disclosed here.
Figure 4:
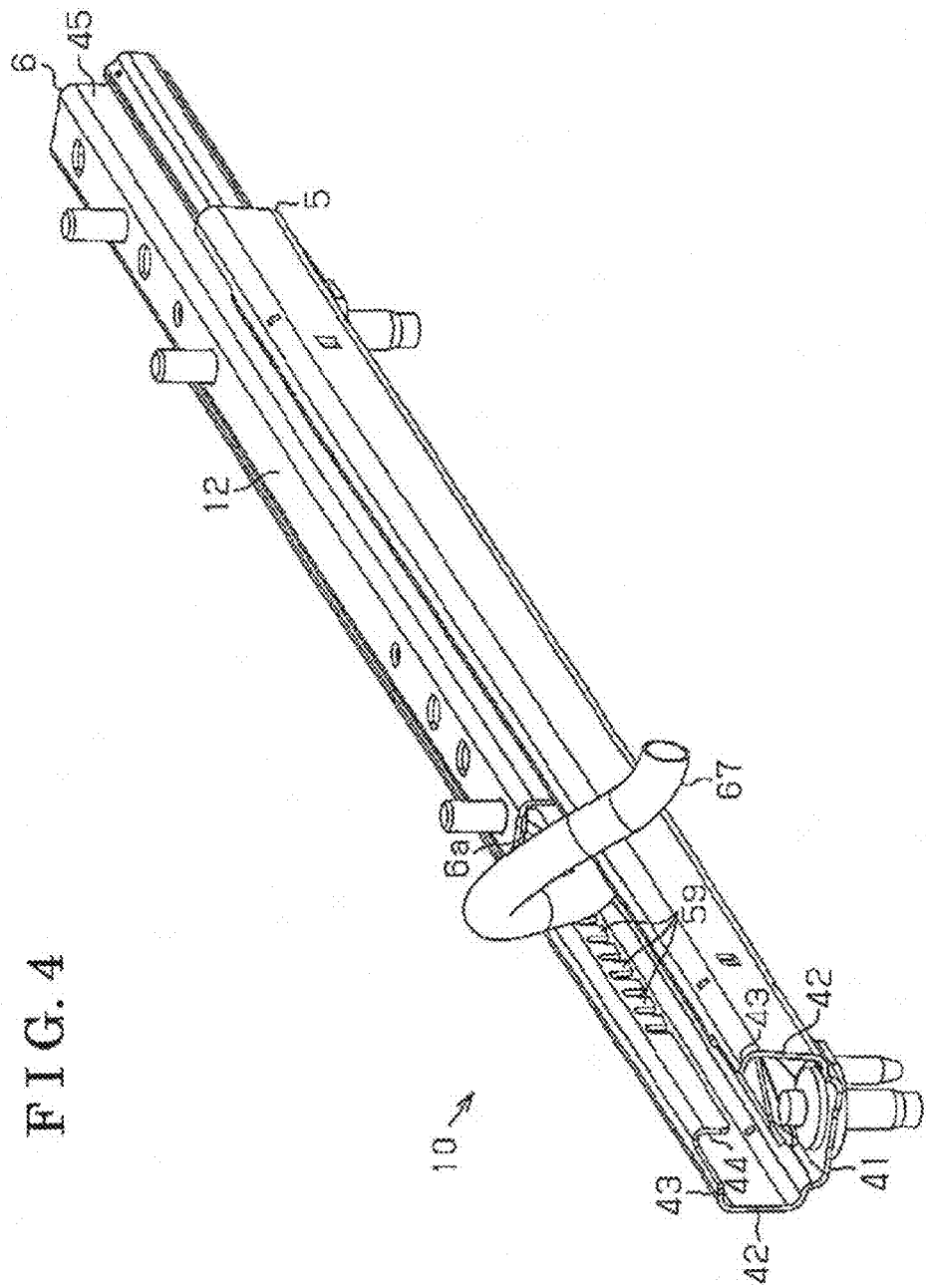
FIG. 4 is a perspective view of the seat slide mechanism according to a second embodiment disclosed here.

A vibration proof structure of a seat apparatus for a vehicle according to a first embodiment of this disclosure will be described as follows with reference to FIGS. 1 to 3. As illustrated in FIG. 1, a seat 1 for a vehicle includes a seat cushion 2 and a seat back 3 arranged at a rear end portion 2a of the seat cushion 2 so as to tilt relative to the rear end portion 2a.

Two lower rails 5 extending in a front and rear direction of the vehicle are arranged in parallel with each other via base brackets 4, respectively, on a floor portion F of the vehicle. Upper rails 6 movable relative to the lower rails 5 in the front and rear direction are mounted on the lower rails 5. The seat 1 is supported on a seat slide mechanism 10 configured by the lower rails 5 and the upper rails 6.

In particular, as illustrated in FIGS. 1, 2A, and 2B, a bilateral pair of side frames 11 configuring a frame of the seat cushion 2 of the seat 1 is fixed to the upper rails 6, respectively, thereby enabling the seat 1 to move along with the upper rails 6 in the front and rear direction. In the first embodiment, a function of the seat slide mechanism 10 is utilized; thereby, a position of the seat 1 is adjustable in the front and rear direction.

As illustrated in FIG. 3, each of the upper rails 6 according to the first embodiment includes a ceiling plate portion 12 formed at an upper end portion (at an end portion at an upper side in FIG. 3) so as to have a substantially planar shape. Bottom plate portions 13 and 14 having substantially planar shapes are formed at each of the side frames 11 of the seat 1 (the seat cushion 2) and are positioned adjacent to end portions of the side frame 11, which are at front and rear sides of the vehicle (at right and left sides in FIG. 3). The ceiling plate portion 12 and the bottom plate portions 13 and 14 are fastened to one another by bolts 15 (i.e., serving as fixing members) and nuts 16 (i.e., serving as the fixing members); thereby, the upper rail 6 and the side frame 11 are fixed to each other so as to integrally move in the front and rear direction.

Further, a through hole 21 is formed in the bottom plate portion 13 of the side frame 11 at the front side of the vehicle while through holes 22 and 23 are formed in the bottom plate portion 14 of the side frame 11 at the rear side of the vehicle. Through holes 25, 26, and 27 corresponding to the through holes 21, 22, and 23 are formed in the ceiling plate portion 12 of the upper rail 6. In the first embodiment, the bolts 15 are attached and inserted from a lower side of the ceiling plate portion 12 (from a lower side in FIG. 3) to the through holes 25, 26, and 27 of the upper rail 6 and to the through holes 21, 22, and 23 of the side frame 11 in a manner that threaded shafts 28 serving as shaft portions of the bolts 15 penetrate through the ceiling plate portion 12 of the upper rail 6 and through the bottom plate portions 13 and 14 of the side frame 11. The nuts 16 are attached to the bolts 15 from an upper side of the bottom plate portions 13 and 14 (from an upper side in FIG. 3) so as to be screwed with the threaded shafts 28 of the bolts 15.

Furthermore, each of the bolts 15 includes a bolt head 29 and the threaded shaft 28. The threaded shaft 28 includes a large-diameter portion 28a at which thread grooves (thread ridges) are not formed. The large-diameter portion 28a is arranged at an end portion of the bolt 15, which is adjacent to the bolt head 29. An axial end (a lower end portion as seen in FIG. 3) of each of the nuts 16 screwed with the bolts 15 is brought into contact with an axial end portion (an upper end portion as seen in FIG. 3) of the large-diameter portion 28a, therefore positioning the nut 16 to a predetermined portion on the threaded shaft 28.

In other words, the large-diameter portion 28a is provided at the threaded shaft 28 so as to serve as a positioning means; thereby, the nut 16 and the bolt head 29 which correspond to a pair of flanged portions are provided in separated positions between which the ceiling plate portion 12 serving as a fixed portion of the upper rail 6 and the bottom plate portions 13 and 14 serving as fixed portions of the side frame 11 are arranged.

According to the first embodiment, an outer diameter D0 of the large-diameter portion 28a, an inner diameter D1 of each of the through holes 21, 22, 23 through which the large-diameter portion 28a is inserted, and an inner diameter D2 of each of the through holes 25, 26, and 27 through which the large-diameter portion 28a is inserted are designed to be values in such a way that each of the bottom plate portions 13 and 14 of the side frame 11 is movable relative to the ceiling plate portion 12 of the upper rail 6 between the nut 16 and the bolt head 29 of the bolt 15.

In particular, the inner diameter D1 of each of the through holes 21, 22, and 23 of the side frame 11 is designed to be slightly greater than the outer diameter D0 of the large-diameter portion 28a. Further, the inner diameter D2 of each of the through holes 25, 26, and 27 of the upper rail 6 is designed to be substantially equal to the outer diameter D0 of the large-diameter portion 28a. Therefore, the upper rail 6 and the side frame 11 are allowed to move relative to each other along an axial direction of the bolt 15 and are fixed to each other so as not to move relative to each other in a direction along the floor portion F, which includes the front and rear direction and a width direction of the vehicle.

Further, disc springs 30 each serving as an elastic member are arranged together with the ceiling plate portion 12 of the upper rail 6 and the bottom plate portions 13 and 14 of the side frame 11, between the nuts 16 and the bolt heads 29 of the bolts 15.

In particular, in a stationary portion α1 between the bottom plate portion 13 of the side frame 11 at the front side of the vehicle and the ceiling plate portion 12 of the upper rail 6, the disc spring 30 is arrange between the ceiling plate portion 12 and the bottom plate portion 13 in a manner to be compressed by a fastening force by the bolt 15 and the nut 16. Meanwhile, in a stationary portion α2 between the bottom plate portion 14 of the side frame 11 at the rear side of the vehicle and the ceiling plate portion 12 of the upper rail 6, the disc spring 30 is arranged between the nut 16 and the bottom plate portion 14 in a manner to be compressed by the fastening force. Thus, according to the first embodiment, vibrations of the seat 1 supported above the upper rail 6 may be reduced by an elastic force of the disc spring 30.

Next, functions of the seat apparatus according to the first embodiment, which is configured as described above, will be explained as follows. According to the first embodiment, the side frame 11 serving as a support member is arranged on the upper rail 6 and is fixed to the upper rail 6 serving as a rail member, via the bottom plate portions 13 and 14 which are arranged at portions at the front and rear sides of the vehicle to serve as the fixed portions relative to the upper rail 6.

Therefore, in a case where the seat cushion 2 corresponding to an element (a seat element) of the seat 1 moves in the front and rear direction, the seat cushion 2 tilts in a manner that one of the rear end portion 2a and a front end portion 2b of the seat cushion 2 is moved upward and the other of the rear end portion 2a and the front end portion 2b is moved downward. Therefore, in the stationary portions α1 and α2 between the upper rail 6 and the side frame 11, the respective fixed portions of the upper rail 6 and the side frame 11, i.e., the ceiling plate portion 12 of the upper rail 6 and each of the bottom plate portions 13 and 14 of the side frame 11 move relative to one another along the axial direction of the bolt 15.

In particular, in a case where the seat cushion 2 moves forward, the seat cushion 2 tilts in a manner that the rear end portion 2a is moved upward and the front end portion 2b is moved downward. Therefore, in the stationary portion α1 at the front side of the vehicle, the bottom plate portion 13 corresponding to the fixed portion of the side frame 11 moves downward, that is, the bottom plate portion 13 moves relative to the ceiling plate portion 12 in a direction in which the bottom plate portion 13 comes close to the ceiling plate portion 12 corresponding to the fixed portion of the upper rail 6. Meanwhile, in the stationary portion α2 at the rear side of the vehicle, the bottom plate portion 14 corresponding to the fixed portion of the side frame 11 moves upward, that is, the bottom plate portion 14 moves relative to the ceiling plate portion 12 in a direction in which the bottom plate portion 14 separates from the ceiling plate portion 12 corresponding to the fixed portion of the upper rail 6.

Here, a direction in which each of the bottom plate portions 13 and 14 of the side frame 11 moves relative to the ceiling plate portion 12 of the upper rail 6 at the time when the seat cushion 2 moves forward (i.e., at the time of a forward movement of the seat cushion 2), is defined as a first relative direction. In such case, the disc springs 30 each serving as the elastic member are arranged between the ceiling plate portion 12 and the bottom plate portion 13 in the first relative direction and between the bottom plate portion 14 and the nut 16 in the first relative direction.

In other words, in the stationary portion α1 at the front side of the vehicle, a direction in which the bottom plate portion 13 of the side frame 11 moves downward in accordance with the forward movement of the seat cushion 2, i.e., the direction in which the bottom plate portion 13 comes close to the ceiling plate portion 12 of the upper rail 6, corresponds to the first relative direction. Further, the bolt head 29 provided below the ceiling plate portion 12 and serving as the flanged portion restricts the bottom plate portion 13 from moving downward via the ceiling plate portion 12, therefore forming a first restriction wall W1 which may restrict the bottom plate portion 13 from moving in the first relative direction. Furthermore, the disc spring 30 is arranged between the bottom plate portion 13 serving as a first member and the ceiling plate portion 12 provided in the first relative direction of the bottom plate portion 13.

Meanwhile, in the stationary portion α2 at the rear side of the vehicle, a direction in which the bottom plate portion 14 of the side frame 11 moves upward in accordance with the forward movement of the seat cushion 2, i.e., the direction in which the bottom plate portion 14 separates from the ceiling plate portion 12 of the upper rail 6, corresponds to the first relative direction. Further, the nut 16 provided above the bottom plate portion 14 and serving as the flanged portion restricts the bottom plate portion 14 from moving upward, therefore forming the first restriction wall W1 which may restrict the bottom plate portion 14 from moving in the first relative direction. Furthermore, the disc spring 30 is arranged between the nut 16 forming the first restriction wall W1 and the bottom plate portion 14 serving as the first member.

That is, according to the first embodiment, at the time of the forward movement of the seat cushion 2, in the stationary portions α1 and α2 between the upper rail 6 and the side frame 11, the bottom plate portions 13 and 14 each corresponding to the fixed portion of the side frame 11 to serve as the first member move in the first relative direction while compressing the disc springs 30 serving as the elastic members. In addition, a resistance force is applied by the elastic force of the disc springs 30 to the bottom plate portions 13 and 14 moving in the first relative direction.

In particular, the disc spring 30 arranged at the stationary portion α1 at the front side of the vehicle presses the bottom plate portion 13 as the first member, upward by means of the elastic force (i.e., the bottom plate portion 13 is pressed by the disc spring 30 in a direction in which the bottom plate portion 13 separates from the ceiling plate portion 12 as the second member). Meanwhile, the disc spring 30 arranged at the stationary portion α2 at the rear side of the vehicle presses the bottom plate portion 14 as the first member, downward by means of the elastic force (i.e., the bottom plate portion 14 is pressed by the disc spring 30 in a direction in which the bottom plate portion 14 comes close to the ceiling plate portion 12 as the second member).

As described above, according to the first embodiment, at the time of the forward movement of the seat cushion 2, the resistance force (a force disturbing a relative movement of the bottom plate portions 13 and 14 to the ceiling plate portion 12) is applied by the disc springs 30 to the bottom plate portions 13 and 14 moving in the first relative direction. Therefore, an energy generated by the forward movement of the seat cushion 2 serving as the seat element is decreased; thereby, vibrations of the seat 1 may be reduced.

On the other hand, at the time when the seat cushion 2 moves rearward (i.e., at the time of a rearward movement of the seat cushion 2), the seat cushion 2 tilts in a manner that the front end portion 2b is moved upward and the rear end portion 2a is moved downward. Therefore, in the stationary portion α1 at the front side of the vehicle, the bottom plate portion 13 serving as the fixed portion of the side frame 11 moves upward, that is, the bottom plate portion 13 moves relative to the ceiling plate portion 12 in the direction in which the bottom plate portion 13 separates from the ceiling plate portion 12 serving as the fixed portion of the upper rail 6. Meanwhile, in the stationary portion α2 at the rear side of the vehicle, the bottom plate portion 14 serving as the fixed portion of the side frame 11 moves downward, that is, the bottom plate portion 14 moves relative to the ceiling plate portion 12 in the direction in which the bottom plate portion 14 comes close to the ceiling plate portion 12 serving as the fixed portion of the upper rail 6. Here, in a direction in which each of the bottom plate portions 13 and 14 of the side frame 11 moves relative to the ceiling plate portion 12 of the upper rail 6 at the time of the rearward movement of the seat cushion 2, is defined as a second relative direction. In such case, the disc spring 30 is not provided in the second relative direction of each of the bottom plate portions 13 and 14.

In other words, in the stationary portion α1 at the front side of the vehicle, a direction in which the bottom plate portion 13 of the side frame 11 moves upward in accordance with the rearward movement of the seat cushion 2, i.e., the direction in which the bottom plate portion 13 separates from the ceiling plate portion 12 of the upper rail 6, corresponds to the second relative direction. In addition, the nut 16 provided above the bottom plate portion 13 and serving as the flanged portion restricts the bottom plate portion 13 from moving upward, therefore forming a second restriction wall W2 which may restrict the bottom plate portion 13 from moving in the second relative direction. The bottom plate portion 13 is biased upward, i.e., in the second relative direction, by the elastic force of the disc spring 30 arranged below the bottom plate portion 13, thereby being brought in advance in contact with the nut 16 forming the second restriction wall W2.

Meanwhile, in the stationary portion α2 at the rear side of the vehicle, a direction in which the bottom plate portion 14 of the side frame 11 moves downward in accordance with the rearward movement of the seat cushion 2, i.e., the direction in which the bottom plate portion 14 comes close to the ceiling plate portion 12 of the upper rail 6, corresponds to the second relative direction. Further, the bolt head 29 provided below the ceiling plate portion 12 and serving as the flanged portion restricts the bottom plate portion 14 from moving downward via the ceiling plate portion 12, therefore forming the second restriction wall W2 which may restrict the bottom plate portion 14 from moving in the second relative direction. Furthermore, the bottom plate portion 14 is biased downward, i.e., in the second relative direction, by the elastic force of the disc spring 30 arranged above the bottom plate portion 14, thereby being brought in advance in contact with the ceiling plate portion 12 serving as the second member.

That is, according to the first embodiment, at the time of the rearward movement of the seat cushion 2, the bottom plate portions 13 and 14 each corresponding to the first member do not receive the resistance force of the disc springs 30. Therefore, the bottom plate portions 13 and 14 are respectively in contact with the nut 16 forming the second restriction wall W2 and with the ceiling plate portion 12. Consequently, the bottom plate portions 13 and 14 may be promptly restricted from moving in the second relative direction by the nut 16 and the bolt head 29 which serve as the second restriction walls W2. As a result, the rearward movement of the seat cushion 2 is restricted in the first embodiment; thereby, the seat 1 may secure a high rigidity for a rear side thereof.

As described above, according to the first embodiment, the following effects may be obtained. According to the first embodiment, the ceiling plate portion 12 as the fixed portion of the upper rail 6 and the bottom plate portions 13 and 14 as the fixed portions of the side frame 11 are fastened to one another by the bolts 15 and the nuts 16. The disc springs 30 each serving as the elastic member are arranged together with the bottom plate portions 13 and 14 each serving as the first member and the ceiling plate portion 12 serving as the second member, between the nuts 16 and the bolt heads 29 of the bolts 15. In addition, in a case where each of the bottom plate portions 13 and 14 moves relative to the ceiling plate portion 12 in the first relative direction corresponding to the forward movement of the seat cushion 2, the disc spring 30 applies the resistance force to each of the bottom plate portions 13 and 14. Meanwhile, in a case where each of the bottom plate portions 13 and 14 moves relative to the ceiling plate portion 12 in the second relative direction corresponding to the rearward movement of the seat cushion 2, the disc spring 30 is positioned so as not to apply the resistance force to each of the bottom plate portions 13 and 14.

In other words, the side frame 11 serving as the support member and including the bottom plate portions 13 and 14 as the fixed portions relative to the upper rail 6 is fixed to the upper rail 6 so as to be positioned thereon. Therefore, in a case where the seat cushion 2 corresponding to the seat element of the seat 1 moves in the front and rear direction of the vehicle, the seat cushion 2 tilts in a manner that one of the rear end portion 2a and the front end portion 2b of the seat cushion 2 is moved upward and the other of the rear end portion 2a and the front end portion 2b is moved downward. Consequently, each of the bottom plate portions 13 and 14 of the side frame 11 moves relative to the ceiling plate portion 12 of the upper rail 6 along the axial direction of the bolt 15 so as to separate from the ceiling plate portion 12 or so as to come close to the ceiling plate portion 12.

Therefore, according to the first embodiment, the disc spring 30 is arranged in the first relative direction of each of the bottom plate portions 13 and 14; thereby, the resistance force based on the elastic force of the disc spring 30 is applied to each of the bottom plate portions 13 and 14 at the time of the forward movement of the seat cushion 2. That is, the disc spring 30 functions as a resistance force applying portion. Therefore, the energy generated by the forward movement of the seat cushion 2 serving as the seat element is decreased and thus the vibrations of the seat 1 may be reduced.

On the other hand, at the time of the rearward movement of the seat cushion 2, each of the bottom plate portions 13 and 14 moving in the second relative direction does not receive the resistance force of the disc spring 30. Therefore, each of the bottom plate portions 13 and 14 may be promptly restricted from moving in the second relative direction by the nut 16 or the bolt head 29 serving as the second restriction wall W2. As a result, the rearward movement of the seat cushion 2 is restricted and the seat 1 may secure the high rigidity for the rear side thereof.

Further, according to the first embodiment, in a case where the seat cushion 2 moves excessively forward, the bolt head 29 or the nut 16 which is placed in the first relative direction from the bottom plate portion 13 or 14 functions as the first restriction wall W1; thereby, the bottom plate portion 13 or 14 may be restricted from moving relative to the ceiling plate portion 12 in the first relative direction. As a result, the seat 1 may obtain a desired rigidity for a front side thereof.

In addition, the bolt 15 and the nut 16 are applied as a fixation structure in which the ceiling plate portion 12 of the upper rail 6, each of the bottom plate portions 13 and 14 of the side frame 11, and the disc spring 30 are arranged between the bolt 15 and the nut 16. Therefore, the nut 16 and the bolt head 29 serve as the pair of flanged portions and thus the first restriction wall W1 and the second restriction wall W2 may be easily formed.

According to the first embodiment, in the stationary portion α1 between the ceiling plate portion 12 of upper rail 6 and the bottom plate portion 13 of the side frame 11 at the front side of the vehicle, the disc spring 30 is arranged between the bottom plate portion 13 and the ceiling plate portion 12 positioned below the bottom plate portion 13. Meanwhile, in the stationary portion α2 between the ceiling plate portion 12 of the upper rail 6 and the bottom plate portion 14 of the side frame 11 at the rear side of the vehicle, the disc spring 30 is arranged between the bottom plate portion 14 and the nut 16 positioned above the bottom plate portion 14.

In the stationary portion α1 at the front side of the vehicle, the direction in which the bottom plate portion 13 moves downward in accordance with the forward movement of the seat cushion 2, i.e., the direction in which the bottom plate portion 13 comes close to the ceiling plate portion 12 of the upper rail 6, corresponds to the first relative direction. Further, in the stationary portion α1 at the front side of the vehicle, the direction in which the bottom plate portion 13 moves upward in accordance with the rearward movement of the seat cushion 2, i.e., the direction in which the bottom plate portion 13 separates from the ceiling plate portion 12 of the upper rail 6, corresponds to the second relative direction. Meanwhile, in the stationary portion α2 at the rear side of the vehicle, the direction in which the bottom plate portion 14 moves upward in accordance with the forward movement of the seat cushion 2, i.e., the direction in which the bottom plate portion 14 separates from the ceiling plate portion 12 of the upper rail 6, corresponds to the first relative direction. Further, in the stationary portion α2 at the rear side of the vehicle, the direction in which the bottom plate portion 14 moves downward in accordance with the rearward movement of the seat cushion 2, i.e., the direction in which the bottom plate portion 14 comes close to the ceiling plate portion 12 of the upper rail 6, corresponds to the second relative direction.

In other words, the stationary portions α1 and α2 between the side frame 11 and the upper rail 6 are arranged at the portions at the front and rear sides of the vehicle, respectively, in which the first relative direction and the second relative direction are opposite from each other. Therefore, the energy generated by the forward movement of the seat cushion 2 may be further effectively reduced while the rearward movement of the seat cushion 2 is restricted. As a result, the vibrations of the seat 1 may be reduced while the seat 1 may secure the high rigidity for the rear side thereof.

According to the first embodiment, the disc spring 30 is arranged between the bolt 15 and the nut 16 while being compressed by the fastening force of the bolt 15 and the nut 16. Therefore, each of the bottom plate portions 13 and 14 is biased in advance in the second relative direction by the elastic force of the disc spring 30; thereby, the rearward movement of the seat cushion 2 may be further promptly restricted. As a result, the seat 1 may secure the high rigidity for the rear side thereof.

According to the first embodiment, the threaded shaft 28 of the bolt 15 includes the large-diameter portion 28a at which the thread grooves (thread ridges) are not formed. The large-diameter portion 28a is arranged at the end portion of the bolt 15, which is adjacent to the bolt head 29. According to such configuration of the threaded shaft 28, the nut 16 may be easily provided in the predetermined portion on the threaded shaft 28. Therefore, the bolt head 29 which serves as the first restriction wall W1 or the second restriction wall W2 and the nut 16 which serves as the first restriction wall W1 or the second restriction wall W2 may be appropriately provided in the separated positions and assembling between the bolt 15 and the nut 16 may be simplified.

The vibration proof structure of the seat apparatus according to a second embodiment of the disclosure will be explained as follows with reference to FIGS. 4 to 9. Configurations of the second embodiment similar to those of the first embodiment will be indicated by the same numeral reference numbers, and detailed descriptions thereof will be omitted.

Figure 8:
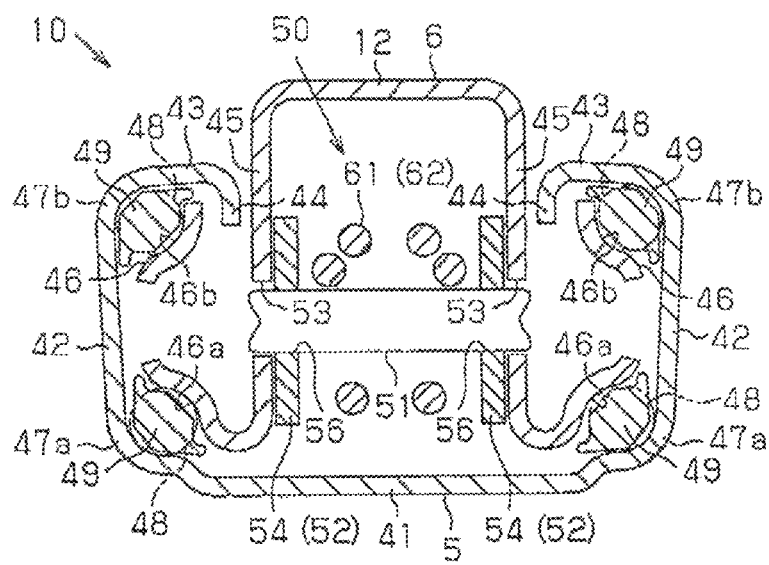
FIG. 8 is a cross sectional view taken along the line VIII-VIII in FIG. 6B and illustrating the seat slide mechanism and the lock mechanism according to the second embodiment disclosed here.

As illustrated in FIGS. 4 to 7B, the seat slide mechanism 10 of the second embodiment includes the lower rail 5 and the upper rail 6 that are provided movable relative to each other. As illustrated in FIGS. 5 and 8, the lower rail 5 includes a bottom wall portion 41 having a planar shape and serving as a fixed portion relative to the floor portion F of the vehicle (relative to the base bracket 4, see FIG. 1). Exterior wall portions 42 are formed at both ends of the bottom wall portion 41 in a width direction thereof (in a right and left direction in FIG. 8) so as to stand upward from the ends of the bottom wall portion 41. Upper wall portions 43 each formed in a flange are formed at respective upper ends (end portions at an upper side in FIG. 8) of the exterior wall portions 42 so as to extend inward from the upper ends of the exterior wall portions 42 in a width direction of the lower rail 5. Folded portions 44 are formed at respective ends of the upper wall portions 43 so as to be folded downward therefrom.

The upper rail 6 includes a pair of side wall portions 45 provided to face each other in a width direction of the upper rail 6, and the ceiling plate portion 12 connecting upper ends of the side wall portions 45 to each other. Folded portions 46 are formed at respective lower ends of the side wall portions 45 so as to be folded outward therefrom in the width direction.

As illustrated in FIG. 8, in the second embodiment, the upper rail 6 is mounted to the lower rail 5 in a manner that an approximately U-shaped cross section formed by the pair of side wall portions 45 and the ceiling plate portion 12 is arranged between a pair of folded portions 44 of the lower rail 5. Each of the folded portions 46 of the upper rail 6 is formed at the lower end of each of the side wall portions 45 so as to protrude upward from the lower end along each of the exterior wall portions 42 of the lower rail 5 and so as to face the exterior wall portion 42 in the width direction. Curved recessed surfaces 46a and 46b extending in a direction in which the upper rail 6 extends (i.e., in a longitudinal direction of the upper rail 6) are formed at the folded portion 46 so as to be provided in positions which face a connected portion (a curved portion 47a) between the bottom wall portion 41 and the exterior wall portion 42 of the lower rail 5 and a connected portion (a curved portion 47b) between the exterior wall portion 42 and the upper wall portion 43 of the lower rail 5. Further, in the second embodiment, rollers 48 each formed in a ball are arranged between the curved recessed surface 46a and the curved portion 47a and between the curved recessed surface 46b and the curved portion 47b; thereby, the lower rail 5 and the upper rail 6 may be configured to smoothly move relative to each other along the longitudinal direction.

In particular, as illustrated in FIG. 5, the rollers 48 are rotatably held by a holder 49 formed in a bar, so as to be accommodated within both end portions of the holder 49. The rollers 48 within the holder 49, and the holders 49 are attached between the lower rail 5 and the upper rail 6, thereby being configured to slidably roll on respective curved surfaces of the curved portions 47a and 47b of the lower rail 5 and on the curved recessed surfaces 46a and 46b of the upper rail 6.

In addition, according to the second embodiment, the seat slide mechanism 10 is provided with a lock mechanism 50 which may restrict or lock a relative movement between the lower rail 5 and the upper rail 6. As illustrated in FIGS. 5 to 8, the lock mechanism 50 includes a support shaft 51 and a lock lever 52 rotating about the support shaft 51.

As illustrated in FIG. 8, support holes 53 facing each other are formed at the side wall portions 45, respectively, of the upper rail 6. The support shaft 51 is provided between the side wall portions 45 so as to extend therebetween in a manner that both end portions of the support shaft 51 are inserted in the support holes 53, respectively.

As illustrated in FIGS. 5, 7, and 8, the lock lever 52 formed in an elongated plate includes a pair of side plate portions 54 and an upper plate portion 55 connecting respective upper end portions of the side plate portions 54. Through holes 56 facing each other are formed at the side plate portions 54, respectively. The support shaft 51 is inserted in the through holes 56 formed at the side plate portions 54; thereby, the lock lever 52 is supported to rotate about the support shaft 51.

As illustrated in FIGS. 5, 6A, 6B, 7A, and 7B, a lock portion 57, outer shape of which is an approximately planar shape is arranged at a first end 52a of the lock lever 52 so as to extend outward in a width direction thereof. Through holes 58 into which the lock portion 57 is insertable are formed at the side wall portions 45, respectively, of the upper rail 6 and are provided in positions which correspond to the first end 52a of the lock lever 52. Plural engagement pawls 59 protruding downward are formed at each of the folded portions 44 of the lower rail 5 so as to form a comb shape. Plural engagement holes 60 engageable with the engagement pawls 59, respectively, of the lower rail 5 are formed at end portions of the lock portion 57 in the width direction. The lock portion 57 is inserted in the through holes 58; thereby, the end portions of the lock portion 57 are provided outward relative to the approximately U-shaped cross section formed by the side wall portions 45 and the ceiling plate portion 12.

In particular, the lock mechanism 50 of the second embodiment is configured as follows. The lock lever 52 supported via the support shaft 51 by the upper rail 6 rotates and the lock portion 57 arranged at the first end 52a therefore moves upward; thereby, the engagement holes 60 of the lock portion 57 are engaged with the engagement pawls 59 of the lower rail 5. Thus, the relative movement between the lower rail 5 and the upper rail 6 may be restricted.

Further, the lock mechanism 50 of the second embodiment includes a spring member 61 formed by a wire rod which is processed by bending. The spring member 61 includes a coil portion 62 and a first extending portion 63. The coil portion 62 is positioned at a radially outward side of the support shaft 51 in a manner to be wounded around the support shaft 51. The first extending portion 63 is continuously formed with the coil portion 62 so as to extend toward the first end 52a of the lock lever 52 (toward a right side in FIG. 7A) and so as to be arranged between the side plate portions 54 of the lock lever 52. In addition, according to the second embodiment, a through hole 65 is formed at the upper plate portion 55 of the lock lever 52 so as to be positioned above the support shaft 51. Furthermore, the spring member 61 includes a second extending portion 66. The spring member 61 is inserted through the through hole 65 into the lock lever 52; thereby, the second extending portion 66 extends from the coil portion 62 to a second end 52b of the lock lever 52 (to a left side in FIG. 7A).

In other words, the spring member 61 of the second embodiment is configured as a torsional coil spring. The first extending portion 63 of the spring member 61 is provided in contact with the upper plate portion 55 of the lock lever 52 from a lower side thereof (from a lower side in FIG. 7A). The second extending portion 66 of the spring member 61 is provided in contact with the ceiling plate portion 12 of the upper rail 6 from the lower side thereof (from the lower side in FIG. 7A). The lock lever 52 is rotatably biased by a biasing force of the spring member 61 in a direction to move the first end 52a upward (to an upper side in FIG. 7A).

Further, as illustrated in FIG. 7A, the lock mechanism 50 of the second embodiment includes an operation lever 67, an end portion 67a of which is inserted from a front opening portion 6a of the upper rail 6 into the upper rail 6. The end portion 67a of the operation lever 67 is provided in contact with the second end 52b of the lock lever 52. In particular, the end portion 67a is provided in contact with the upper plate portion 55 of the lock lever 52 from the lower side thereof.

In addition, according to the second embodiment, the second extending portion 66 of the spring member 61 is configured to extend so that an end 66a thereof is positioned at the front side of the vehicle with respect to the second end 52b of the lock lever 52, i.e., so that the end 66a is positioned adjacent to the front opening portion 6a of the upper rail 6. The operation lever 67 is configured so that a portion thereof (the end portion 67a) is inserted in the upper rail 6 and a lower side of the inserted portion (the end portion 67a) is supported by the end 66a of the second extending portion 66.

In other words, the operation lever 67 is configured so that an operation portion thereof which is arranged at an outside of the upper rail 6 is operated; thereby, the end portion 67a inserted within the upper rail 6 moves upward. When the end portion 67a moves upward, the second end 52b of the lock lever 52 is lifted upward by the end portion 67a; thereby, the lock lever 52 rotates in a direction to move the first end 52a downward. Therefore, an engagement between the engagement holes 60 of the lock lever 52 and the engagement pawls 59 of the lower rail 5 are released; thereby, the relative movement of the lower rail 5 and the upper rail 6 is allowed.

Figure 9:
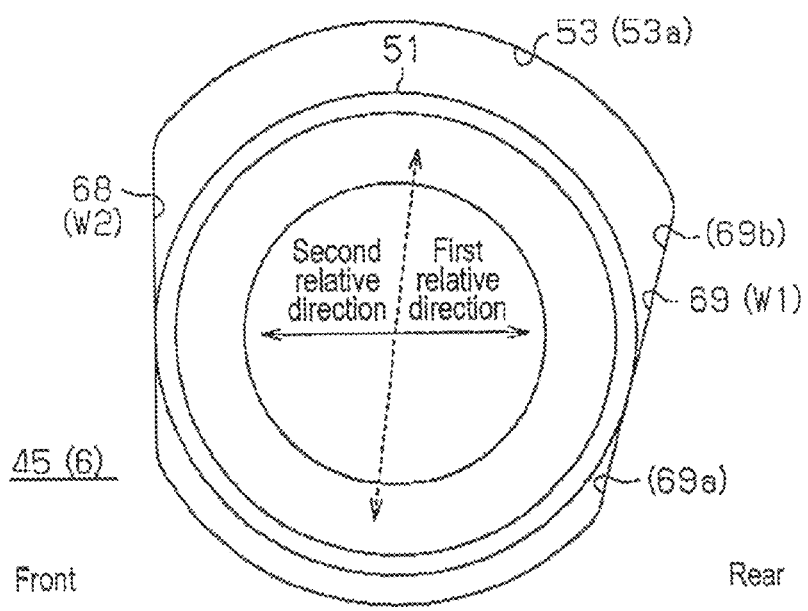
FIG. 9 is a configuration diagram schematically illustrating a support shaft of a lock lever and a support hole supporting the support shaft according to the second embodiment disclosed here.

Further, according to the second embodiment, as illustrated in FIGS. 7B and 9, a vertical surface 68 is formed at an inner surface of each of the support holes 53 formed at the side wall portions 45 of the upper rail 6, so as to be in a position which is at the front side (at a left side in FIG. 9) of the vehicle with respect to the support shaft 51 inserted in the support holes 53. The vertical surface 68 extends along an upper and lower direction and substantially in perpendicular to the front and rear direction of the vehicle along which the upper rail 6 extends. In addition, an inclined surface 69 is formed at the inner surface of the support hole 53 so as to be in a position which is at the rear side (at a right side in FIG. 9) of the vehicle with respect to the support shaft 51 inserted in the support holes 53. The inclined surface 69 is inclined relative to the front and rear direction. In particular, the inclined surface 69 includes an inclination in a manner that a lower end portion 69a of the inclined surface 69 is positioned at the front side of the vehicle relative to an upper end portion 69b of the inclined surface 69. A profile of the support hole 53 is designed to allow the support shaft 51 to move between the vertical surface 68 and the inclined surface 69.

In particular, the support hole 53 is formed to have an elongated hole shape so that an inner diameter thereof in the upper and lower direction is greater than a diameter of the support shaft 51, i.e., the support hole 53 has the profile in a manner that an inner diameter thereof in the front and rear direction of the vehicle increases from a lower portion to an upper portion of the support hole 53. Therefore, the support shaft 51 is allowed to move relative to the support hole 53 therewithin in the upper and lower direction. In addition, the support shaft 51 is allowed to move relative to the support hole 53 in the front and rear direction between the vertical surface 68 and the inclined surface 69 within the support hole 53 while moving to an upper side of the support hole 53.

Furthermore, according to the second embodiment, the coil portion 62 of the spring member 61 is arranged at the radially outward side of the support shaft 51 so as to be wounded therearound as described above (see FIG. 7A). That is, the support shaft 51 is biased downward by the elastic force of the spring member 61 serving as the torsional coil spring, thereby being positioned at a lower side of the support hole 53 therewithin in a manner to be provided between the vertical surface 68 at the front side of the vehicle and the inclined surface 69 at the rear side of the vehicle.

Next, functions of the seat apparatus according to the second embodiment, which is configured as described above, will be explained as follows. In the second embodiment, the relative movement between the lower rail 5 and the upper rail 6 is restricted by the engagement between the engagement pawls 59 arranged at the lower rail 5 and the engagement holes 60 arranged at the upper rail 6. In a case where the seat cushion 2 (see FIG. 1) supported above the upper rail 6 and serving as the seat element moves in the front and rear direction of the vehicle, the support shaft 51 supporting the lock lever 52 apparently moves relative to the support holes 53 in the front and rear direction within the support holes 53 into which the support shaft 51 is inserted.

In particular, the upper rail 6 (the side wall portions 45 of the upper rail 6) in which the support holes 53 are formed moves integrally with the seat cushion 2 supported by the upper rail 6. Meanwhile, the lower rail 5 moves integrally with the floor portion F (with the base bracket 4, see FIG. 1) to which the lower rail 5 is fixed. In addition, the lock lever 52 rotating about the support shaft 51 supported by the upper rail 6 is in a state where the engagement holes 60 are engaged with the engagement pawls 59 of the lower rail 5.

In other words, for example, in a case where the seat cushion 2 moves forward (i.e., at the time of a forward movement of the seat cushion 2), the upper rail 6 moves relative to the lower rail 5 toward the front side of the vehicle. Therefore, the support shaft 51 apparently moves relative to the support holes 53 therewithin toward the rear side of the vehicle. Meanwhile, for example, in a case where the seat cushion 2 moves rearward (i.e., at the time of a rearward movement of the seat cushion 2), the upper rail 6 moves relative to the lower rail 5 toward the rear side of the vehicle. Therefore, the support shaft 51 apparently moves relative to the support holes 53 therewithin toward the front side of the vehicle.

Thus, according to the second embodiment, the support shaft 51 configures the first member and each of the side wall portions 45 of the upper rail 6 configures the second member. In addition, the inner wall surface of each of the support holes 53 configures the first restriction wall W1 and the second restriction wall W2. A direction in which the support shaft 51 apparently moves within the support hole 53 to the rear side of the vehicle corresponds to the first relative direction while a direction in which the support shaft 51 apparently moves within the support hole 53 to the front side of the vehicle corresponds to the second relative direction.

Here, as described above, the inclined surface 69 is formed at the support hole 53 so as to be provided in the position that is at the rear side of the vehicle with respect to the support shaft 51 within the support hole 53. Therefore, in a case where the seat cushion 2 moves forward, the support shaft 51 moves within the support hole 53 to the upper side thereof so as to slide on the inclined surface 69, thereby being allowed to move to the rear side of the vehicle. In other words, the support shaft 51 slides on the inclined surface 69, thereby receiving a resistance force while moving in the first relative direction that corresponds to the forward movement of the seat cushion 2. Furthermore, according to the second embodiment, the support shaft 51 is biased downward by the elastic force of the spring member 61. Accordingly, at the time of the forward movement of the seat cushion 2, the support shaft 51 moves in the first relative direction against the elastic force of the spring member 61.

As a result, in the second embodiment, a resistance force is applied to the support shaft 51 moving in the first relative direction; therefore, an energy generated by the forward movement of the seat cushion 2 serving as the seat element is decreased and thus vibrations of the seat 1 may be reduced.

In addition, the support shaft 51 is slidably moved to the upper end portion 69b of the inclined surface 69, therefore being brought into contact with an upper wall surface 53a of the support hole 53. Consequently, in the second embodiment, the support shaft 51 is restricted from moving upward; thereby, the inclined surface 69 functions as the first restriction wall W1.

On the other hand, at the time of the rearward movement of the seat cushion 2, the support shaft 51 is brought into contact with the vertical surface 68 formed at the support hole 53 so as to be in the position that is at the front side of the vehicle with respect to the support shaft 51 within the support hole 53. At the time of the rearward movement of the seat cushion 2, the support shaft 51 moves relative to the support hole 53 toward the front side of the vehicle so as to be brought into contact with the vertical surface 68 configuring the second restriction wall W2, i.e., the support shaft 51 moves in the second relative direction corresponding to the rearward movement of the seat cushion 2. In such case, a specific resistance force is not applied to the support shaft 51. Therefore, according to the second embodiment, the rearward movement of the seat cushion 2 is promptly restricted and thus the seat 1 may secure the high rigidity for the rear side thereof.

As described above, according to the second embodiment, the following effects may be obtained. The support shaft 51 of the lock lever 52 is arranged between the side wall portions 45 of the upper rail 6 so as to extend between the side wall portions 45 in a state where the both end portions of the support shaft 51 are inserted in the support holes 53 formed at the side wall portions 45, respectively. The lock portion 57 is provided at the first end 52a of the lock lever 52. The lock portion 57 includes the plural engagement holes 60 engageable with the plural engagement pawls 59 provided at the lower rail 5. The engagement holes 60 serving as engaging portions engage with the engagement pawls 59 serving as engaged portions; thereby, the lock mechanism 50 restricts the relative movement between the lower rail 5 and the upper rail 6. The vertical surface 68 is formed at the support hole 53 so as to be in the position that is at the front side of the vehicle with respect to the support shaft 51 within the support hole 53. The vertical surface 68 extends along the upper and lower direction and substantially in perpendicular to the front and rear direction of the vehicle. Further, the inclined surface 69 is formed at the support hole 53 so as to be in the position that is at the rear side of the vehicle with respect to the support shaft 51 within the support hole 53. The support hole 53 has the elongated hole shape in a manner that the inner diameter thereof in the upper and lower direction is greater than the diameter of the support shaft 51 so as to allow the support shaft 51 to move between the vertical surface 68 and the inclined surface 69 within the support hole 53.

According to the aforementioned configuration, at the time of the forward movement of the seat cushion 2, the support shaft 51 apparently moves relative to the support hole 53 therewithin toward the rear side of the vehicle. In addition, the support shaft 51 moves to the upper side of the support hole 53 therewithin so as to slide on the inclined surface 69 provided at the rear side of the vehicle with respect to the support shaft 51. Therefore, the support shaft 51 receives the resistance force while moving in the first relative direction that corresponds to the forward movement of the seat cushion 2. That is, the inclined surface 69 functions as the resistance force applying portion. Therefore, the energy generated by the forward movement of the seat cushion 2 serving as the seat element is decreased and thus the vibrations of the seat 1 may be reduced.

Meanwhile, at the time of the rearward movement of the seat cushion 2, the support shaft 51 apparently moves relative to the support hole 53 therewithin toward the front side of the vehicle. At this time, the specific resistance force is not applied to the support shaft 51 in accordance with the movement of the support shaft 51 in the second relative direction corresponding to the rearward movement of the seat cushion 2. Therefore, the vertical surface 68 provided at the front side of the vehicle with respect to the support shaft 51 functions as the second restriction wall W2 to thereby promptly restrict the movement of the support shaft 51 in the second relative direction. As a result, the rearward movement of the seat cushion 2 is restricted and thus the seat 1 may secure the high rigidity for the rear side thereof.

Moreover, in a case where the seat cushion 2 moves excessively forward, the inner surface of the support hole 53, which is positioned at the rear side of the vehicle with respect to the support shaft 51 and which includes the inclined surface 69, configures the first restriction wall W1, thereby restricting the support shaft 51 from moving relative to the support hole 53 in the first relative direction. As a result, the desired rigidity of the seat 1 may be secured for the front side of the seat 1.

According to the second embodiment, the support shaft 51 is biased downward by the elastic force of the spring member 61 serving as the elastic member to bias the lock lever 52 so that the lock lever 52 rotates. Thus, the spring member 61 serves as a biasing portion and may thereby bias the support shaft 51 in the second relative direction. Accordingly, the resistance force based on the elastic force of the spring member 61 may be applied to the support shaft 51 moving in the first relative direction. That is, the spring member 61 functions as the resistance force applying portion. In addition, the support shaft 51 may be brought in advance into contact with the vertical surface 68 by the spring member 61. Consequently, the rearward movement of the seat cushion 2 may be promptly restricted. As a result, the seat 1 may secure the high rigidity for the rear side thereof.

The vibration proof structure of the seat apparatus according to a third embodiment of the disclosure will be explained as follows with reference to FIGS. 10 to 14. Configurations of the third embodiment similar to those of the first embodiment will be indicated by the same numeral reference numbers, and detailed descriptions thereof will be omitted.

Figure 10:
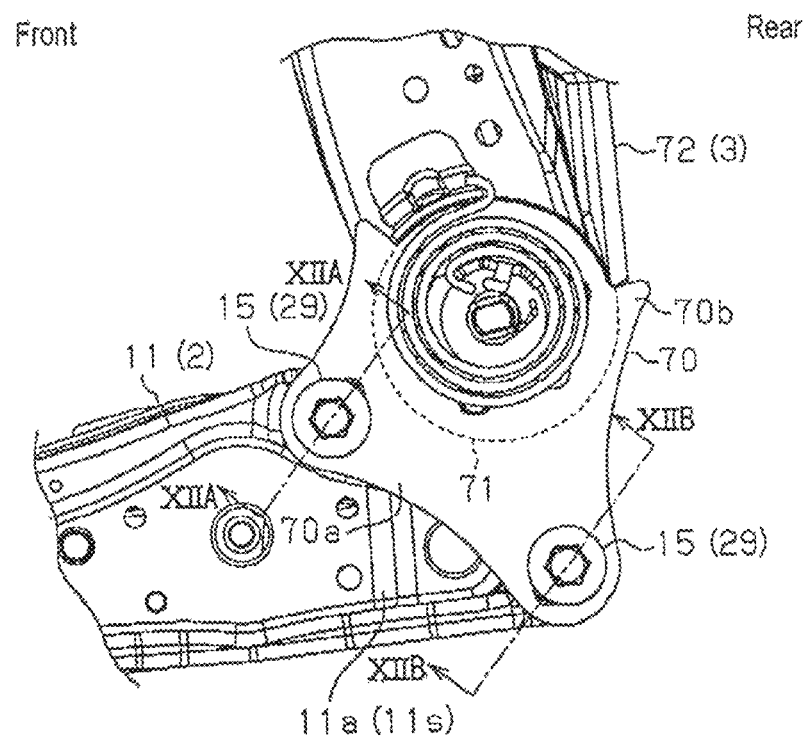
FIG. 10 is a side view illustrating the side frame of a seat cushion and a support bracket which is fixed to the side frame to support a seat back, according to a third embodiment disclosed here.

As illustrated in FIG. 10, according to the third embodiment, a support bracket 70 is fixed to a rear end portion 11a of each of the side frames 11 configuring the frame of the seat cushion 2. A frame 72 of the seat back 3 is connected via a recliner 71 to the support bracket 70; thereby, the seat back 3 is configured to be tiltably supported by the rear end portion 2a of the seat cushion 2 (see FIG. 1).

The support bracket 70 according to the third embodiment is formed substantially in a planar shape. The support bracket 70 is fixed to a side surface 11s of the side frame 11 by the bolts 15 serving as the fixing members and the nuts (16) serving as the fixing members.

Figure 11:
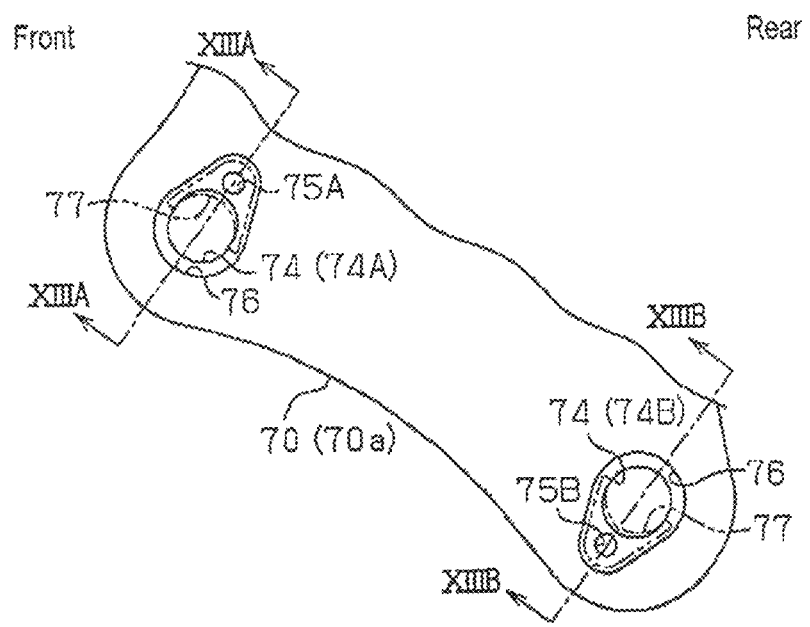
FIG. 11 is a side view of a portion adjacent to a lower end portion of the support bracket according to the third embodiment disclosed here.
Figure 12A:
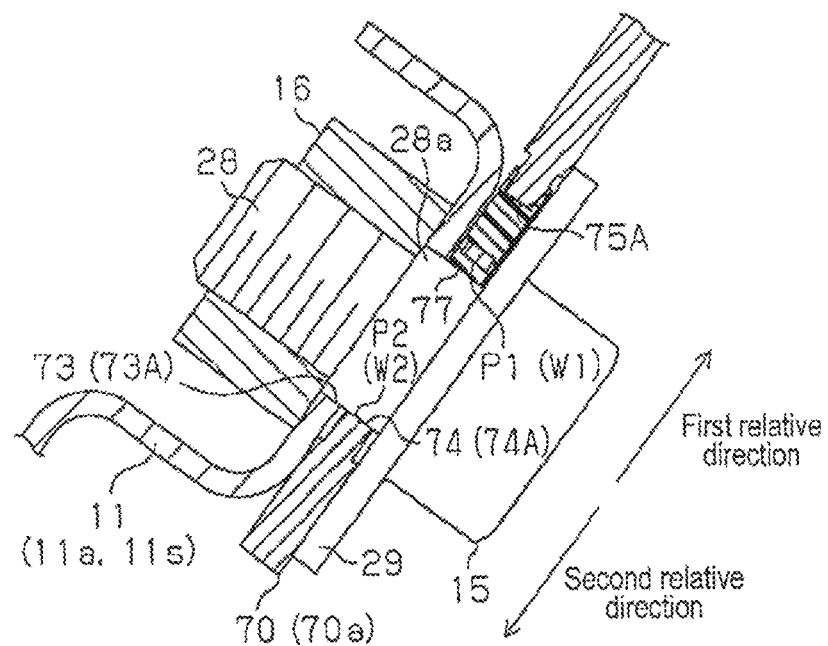
FIG. 12A is a cross sectional view taken along the line XIIA-XIIA in FIG. 10 and illustrating a fixing structure between the side frame and the support bracket according to the third embodiment disclosed here.
Figure 12B:
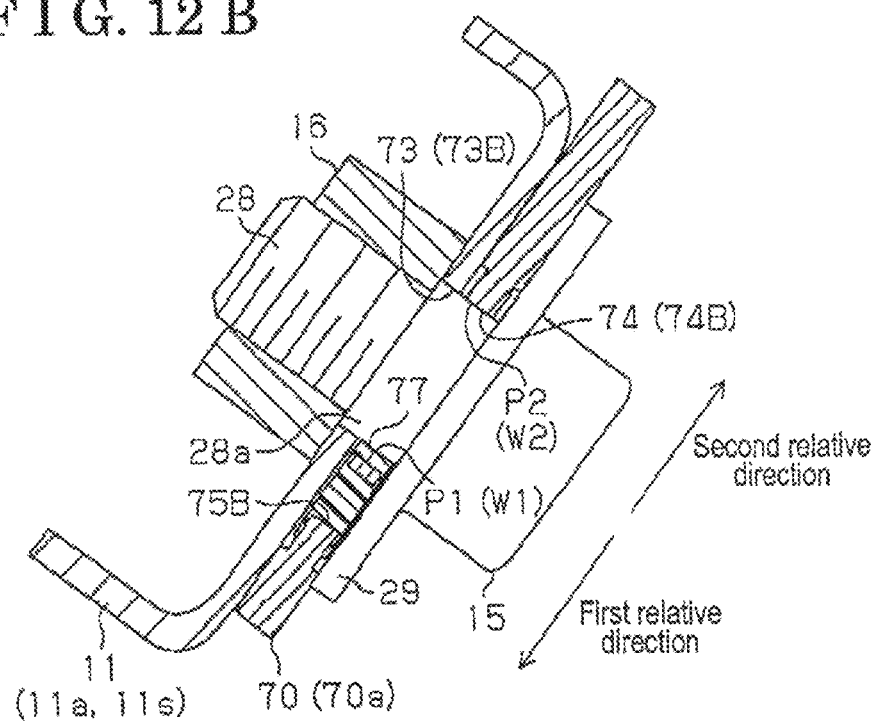
FIG. 12B is a cross sectional view taken along the line XIIB-XIIB in FIG. 10 and illustrating the fixing structure between the side frame and the support bracket according to the third embodiment disclosed here.

In particular, the support bracket 70 and the side frame 11 are fixed to each other via first and second positions which are provided at the rear end portion 11a of the side frame 11 in a separated manner in the front and rear direction and in the upper and lower direction. In the third embodiment, a pair of insertion holes 73 (73A, 73B) opened to the side surface 11s of the side frame 11 is formed at the side surface 11s so as to be in the first and second positions separated in the front and rear direction and in the upper and lower direction. As illustrated in FIGS. 11, 12A, and 12B, a pair of insertion holes 74 (74A, 74B) corresponding to the pair of insertion holes 73 (73A, 73B) of the side frame 11 is formed at a lower end portion 70a of the support bracket 70.

Further, according to the third embodiment, the threaded shaft 28 serving as the shaft portion of each of the bolts 15 is attached to the support bracket 70 and the side frame 11 from the direction of the support bracket 70 in a manner to be inserted in each of the insertions holes 73 (73A, 73B) and 74 (74A, 74B). The side frame 11 and the support bracket 70 are arranged between the bolt head 29 of the bolt 15 and the nut 16 screwed with the threaded shaft 28; thereby, the support bracket 70 is fixed to the side surface 11s of the side frame 11 by the fastening force of the bolt 15 and the nut 16.

Furthermore, according to the third embodiment, as illustrated in FIGS. 12A and 12B, an inner diameter of each of the insertion holes 73 (73A, 73B) is designed to be substantially equal to a diameter of the threaded shaft 28. Each of the insertion holes 74 (i.e., first and second insertion holes 74A, 74B) is formed to have an elongate hole shape.

In particular, as illustrated in FIG. 11, the first insertion hole 74A is formed at the lower end portion 70a of the support bracket 70 so as to be adjacent to a front end of the lower end portion 70a. The second insertion hole 74B is formed at the lower end portion 70a of the support bracket 70 so as to be adjacent to a rear end of the lower end portion 70a. Thus, the first insertion hole 74A is provided at front and upper sides relative to the second insertion hole 74B in a state where the support bracket 70 is attached to the side frame 11.

Additionally, a first through hole 75A including a small diameter compared to a diameter of the first insertion hole 74A is formed at the support bracket 70 so as to be positioned at rear and upper sides relative to the first insertion hole 74A. Likewise, a second through hole 75B is including a small diameter compared to a diameter of the second insertion hole 74B is formed at the support bracket 70 so as to be positioned at lower and front sides relative to the second insertion hole 74B. The first insertion hole 74A is formed to have the elongated hole shape extending in a direction linearly connecting between the center point of the first insertion hole 74A and the center point of the first through hole 75A formed adjacent to the first insertion hole 74A. The second insertion hole 74B is formed to have the elongated hole shape extending in a direction linearly connecting between the center point of the second insertion hole 74B and the center point of the second through hole 75B formed adjacent to the second insertion hole 74B.

Figure 13A:
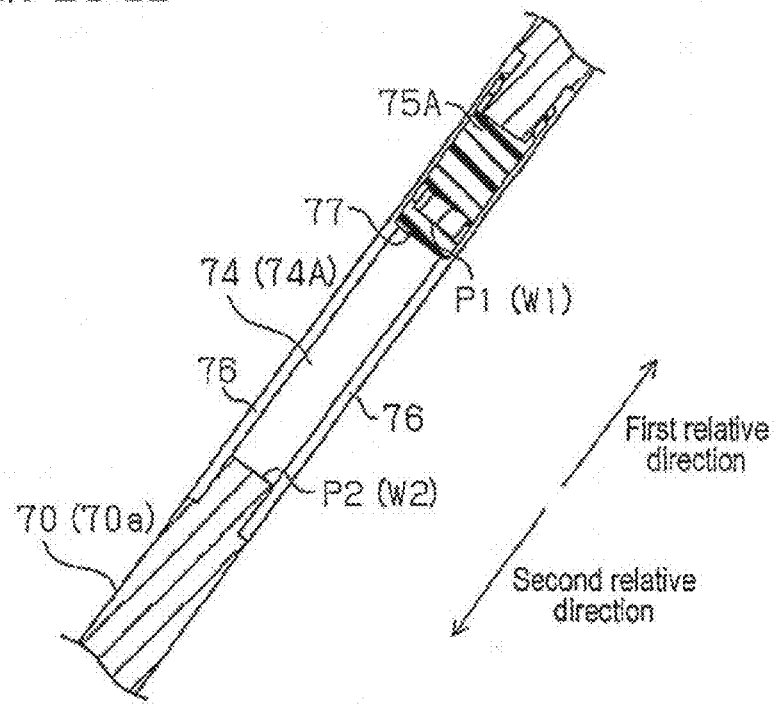
FIG. 13A is a cross sectional view taken along the line XIIIA-XIIIA in FIG. 11 and illustrating an insertion hole formed at the lower end portion of the support bracket according to the third embodiment disclosed here.
Figure 13B:
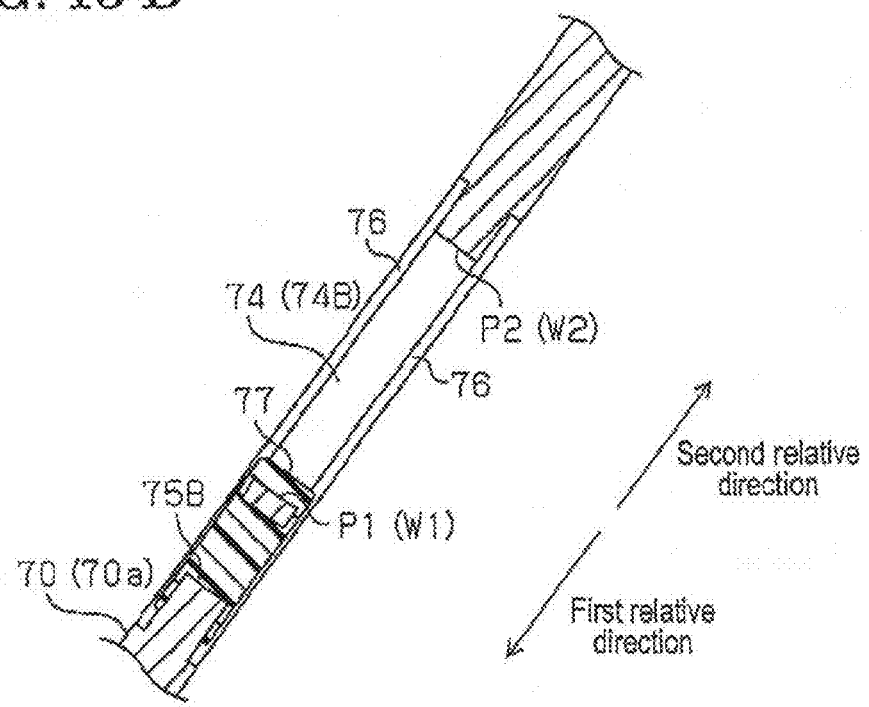
FIG. 13B is a cross sectional view taken along the line XIIIB-XIIIB in FIG. 11 and illustrating an insertion hole formed at the lower end portion of the support bracket according to the third embodiment disclosed here.

As illustrated in FIGS. 13A and 13B, an elastic body 77 is arranged within each of the first and second insertion holes 74A and 74B. The elastic body 77 covers one of end portions (first and second end portions P1 and P2) in a direction of a long side of the elongated hole shape of each of the first and second insertion holes 74A and 74B, i.e., the elastic body 77 covers an inner surface of the first end portion P1 positioned at each of the first and second through holes 75A and 75B formed adjacent to the first and second insertion holes 74A and 74B, respectively. In particular, shallow grooves 76 are recessed at a periphery of the first insertion hole 74A and the first through hole 75A adjacent to the first insertion hole 74A and at a periphery of the second insertion hole 74B and the second through hole 75B adjacent to the second insertion hole 74B. In the third embodiment, the shallow grooves 76 are formed at both surfaces of the support bracket 70. The elastic body 77 is formed, for example, of rubber and is provided so as to cover not only the first end portion P1 of each of the first and second insertion holes 74A and 74B but also each of the first and second through holes 75A and 75B and the shallow groove 76 adjacent to each of the first and second through holes 75A and 75B.

In the third embodiment, as illustrated in FIGS. 12A and 12B, the large-diameter portion 28a is formed at the end portion of the bolt 15, which is adjacent to the bolt head 29, in the same way as in the first embodiment. According to the third embodiment, the inner diameter of each of the insertion holes 73 (73A, 73B) of the side frame 11s is designed to be substantially equal to a diameter of the large-diameter portion 28a. An inner diameter of each of the insertion holes 74 (74A, 74B) in a direction of a short side of the elongated hole shape of each of the insertion holes 74 (74A, 74B) is designed to be substantially equal to the diameter of the large-diameter portion 28a. The threaded shaft 28 of the bolt 15 is inserted in a penetrating manner in each of the insertion holes 73 (73A, 73B) of the side frame 11 and each of the insertion holes 74 (74A, 74B) of the support bracket 70 in a state where a portion of a circumferential surface of the large-diameter portion 28*a* is in contact with the elastic body 77.

Next, functions of the seat apparatus according to the third embodiment, which is configured as described above, will be described below. According to the third embodiment, as illustrated in FIG. 14, the support bracket 70 supporting the seat back 3 serving as the seat element is configured so that the lower end portion 70*a* is fixed to the side frame 11 of the seat cushion 2. Therefore, the support bracket 70 tilts about the lower end portion 70*a* fixed to the side frame 11, at the time of forward and rearward movements of the seat back 3 supported by the support bracket 70 thereabove.

Here, as described above, the support bracket 70 and the side frame 11 are fixed to each other via the first and second positions separated in the front and rear direction and in the upper and lower direction at the rear end portion 11*a* of the side frame 11. Therefore, at the time of the forward and rearward movements of the seat back 3, rotational moment (acting in a direction of each arrow indicated by a dashed line in FIG. 14) is generated about a substantial intermediate portion (i.e., serving as a rotation center P0) between stationary portions α3 and α4 of the support bracket 70 relative to the side frame 11.

However, the inner diameter of each of the insertion holes 73 (73A, 73B) of the side frame 11 is designed to be substantially equal to the diameter of the threaded shaft 28 (the large-diameter portion 28*a*) of the bolt 15 as described above. Accordingly, the threaded shaft 28 inserted in each of the insertion holes 73 (73A, 73B) and serving as the shaft portion may not move relative to the side frame 11 in a direction in which the rotational moment is generated.

On the other hand, each of the insertion holes 74 (74A, 74B) of the support bracket 70 is formed to have the elongated hole shape extending in a direction substantially identical to the direction in which the rotational moment is generated, i.e., in a direction in which the threaded shaft 28 moves relative to each of the insertion holes 74 (74A, 74B) therewithin at the time of the forward and rearward movements of the seat back 3 (the direction in which the threaded shaft 28 moves relative to each of the insertion holes 74 (74A, 74B) therewithin at the time of the forward and rearward movements of the seat back 3 is opposite from the direction in which the rotational moment is generated). Therefore, the threaded shaft 28 apparently moves relative to each of the insertion holes 74 (74A, 74B) therewithin along the direction of the long side of each of the insertion holes 74 (74A, 74B) in which the threaded shaft 28 is inserted.

In other words, at the time of the forward movement of the seat back 3, the support bracket 70 tilts in a direction in which an upper end portion 70*b* thereof supporting the seat back 3 moves forward along with the seat back 3; therefore, rotational moment acting in a counterclockwise direction seen in FIG. 14 is generated at the lower end portion 70*a* of the support bracket 70. As a result, the threaded shaft 28 of the bolt 15 within each of the insertion holes 74 (74A, 74B) of the support bracket 70 apparently moves relative to each of the insertion holes 74 (74A, 74B) in a direction substantially opposite from the counterclockwise direction of the rotational moment as seen in FIG. 14.

In particular, the threaded shafts 28 respectively inserted in the first insertion hole 74A and the second insertion hole 74B move therewithin toward the first through hole 75A and the second through hole 75B that are positioned adjacent to the first insertion hole 74A and the second insertion hole 74B. That is, the threaded shaft 28 within the first insertion hole 74A configuring the stationary portion α3 at the front side of the vehicle moves relative to the first insertion hole 74A in an upper right direction seen in FIG. 14. In addition, the threaded shaft 28 within the second insertion hole 74B configuring the stationary portion α4 at the rear side of the vehicle moves relative to the second insertion hole 74B in a lower left direction seen in FIG. 14.

On the other hand, at the time of the rearward movement of the seat back 3, the support bracket 70 tilts in a direction in which the upper end portion 70*b* moves rearward along with the seat back 3; therefore, rotational moment acting in a clockwise direction seen in FIG. 14 is generated at the lower end portion 70*a* of the support bracket 70. As a result, the threaded shafts 28 respectively serving as the shaft portions of the bolts 15 and inserted within the first insertion hole 74A and the second insertion hole 74B that configure the stationary portions α3 and α4, apparently move relative to the first insertion hole 74A and the second insertion hole 74B in a direction substantially opposite from the clockwise direction of the rotational moment as seen in FIG. 14.

In particular, the threaded shafts 28 within the first insertion hole 74A and the second insertion hole 74B that have the elongated hole shapes apparently move within the first insertion hole 74A and the second insertion hole 74B in directions opposite from the first through hole 75A and the second through hole 75B. That is, the threaded shaft 28 within the first insertion hole 74A configuring the stationary portion α3 at the front side of the vehicle moves relative to the first insertion hole 74A in the lower left direction seen in FIG. 14. In addition, the threaded shaft 28 within the second insertion hole 74B configuring the stationary portion α4 at the rear side of the vehicle moves relative to the second insertion hole 74B in the upper right direction seen in FIG. 14.

Thus, in the third embodiment, the threaded shaft 28 of the bolt 15 configures the first member and the support bracket 70 configures the second member. The first and second end portions P1 and P2 in the direction of the long side of the elongated hole shape of each of the insertion holes 74 (74A, 74B) arranged at the support bracket 70 configure the first restriction wall W1 and the second restriction wall W2, respectively. In addition, a direction in which the threaded shafts 28 respectively inserted in the insertion holes 74 (74A, 74B) apparently move relative to the insertion holes 74 (74A, 74B) therewithin toward the respective first end portions P1 adjacent to the first through hole 75A and the second through hole 75B corresponds to the first relative direction. A direction in which the threaded shafts 28 respectively inserted in the insertion holes 74 (74A, 74B) apparently move relative to the insertion holes 74 (74A, 74B) therewithin toward the respective second end portions P2 positioned opposite from the first end portions P1 in the direction of the long side of the insertion holes 74 (74A, 74B) corresponds to the second relative direction.

Here, the elastic body 77 is arranged at each of the insertion holes 74 (74A, 74B) as described above. The elastic body 77 covers the first end portion P1 positioned in the first relative direction in the direction of the long side of each of the insertion holes 74 (74A, 74B) (see FIGS. 12A, 12B, 13A, and 13B). Accordingly, at the time of the forward movement of the seat back 3, the threaded shaft 28 moves in the first relative direction within each of the insertion holes 74 (74A, 74B) while compressing the elastic body 77 arranged between the threaded shaft 28 and the first end portion P1 configuring the first restriction wall W1.

In other words, according to the third embodiment, a resistance force is applied to the threaded shaft 28 moving in the first relative direction, by an elastic force of the elastic body 77 positioned between the threaded shaft 28 and the first end portion P1 provided at one side in the direction of the long side of each of the insertion holes 74 (74A, 74B), i.e., the elastic body 77 serves as the resistance force applying portion. Therefore, an energy generated by the forward movement of the seat back 3 corresponding to the seat element is decreased and thus vibrations of the seat 1 may be reduced.

On the other hand, at the time of the rearward movement of the seat back 3, the threaded shaft 28 is brought into contact with the second end portion P2 positioned in the second relative direction from the threaded shaft 28 and provided at the other side in the direction of the long side of each of the insertion holes 74 (74A, 74B). At this time, the elastic body 77 is not compressed by the movement of the threaded shaft 28 in the second relative direction within each of the insertion holes 74 (74A, 74B). That is, a specific resistance force is not applied to the threaded shaft 28 when the threaded shaft 28 moves in the second relative direction within each of the insertion holes 74 (74A, 74B). As a result, according to the third embodiment, the rearward movement of the seat back 3 is promptly restricted and thus the seat 1 may secure the high rigidity for the rear side thereof.

As described above, according to the third embodiment, the following effects may be obtained. The support bracket 70 supporting the seat back 3 is fixed to the side surface 11s of the side frame 11 configuring the frame of the seat cushion 2, by means of the bolts 15 serving as the fixing members and the nuts 16 serving as the fixing members. The threaded shaft 28 of each of the bolts 15 is inserted in each of the insertion holes 73 (73A, 73B) formed at the side frame 11 and in each of the insertion holes 74 (74A, 74B) formed at the support bracket 70. Each of the insertion holes 73 (73A, 73B) of the side frame 11 includes the inner diameter substantially equal to the diameter of the large-diameter portion 28a of the threaded shaft 28. Meanwhile, each of the insertion holes 74 (74A, 74B) is formed to have the elongated hole shape extending in the direction in which the threaded shaft 28 moves relative to each of the insertion holes 74 (74A, 74B) therewithin at the time of the forward and rearward movements of the seat back 3. In addition, the elastic body 77 is arranged at each of the insertion holes 74 (74A, 74B) of the support bracket 70. The elastic body 77 covers the first end portion P1 positioned in the first relative direction of each of the insertion holes 74 (74A, 74B).

According to the aforementioned configuration in the third embodiment, at the time of the forward movement of the seat back 3, the threaded shaft 28 moves in the first relative direction within each of the insertion holes 74 (74A, 74B) while compressing the elastic body 77 arranged between the threaded shaft 28 and the first end portion P1. At this time, the resistance force is applied to the threaded shaft 28 moving in the first relative direction, by the elastic force of the elastic body 77. That is, the elastic body 77 serves as the resistance force applying portion. Therefore, the energy generated by the forward movement of the seat back 3 corresponding to the seat element is decreased and thus the vibrations of the seat 1 may be reduced.

On the other hand, at the time of the rearward movement of the seat back 3, the threaded shaft 28 moves in the second relative direction within each of the insertion holes 74 (74A, 74B). At this time, the elastic body 77 is not compressed by the movement of the threaded shaft 28 in the second relative direction. Therefore, the specific resistance force is not applied to the threaded shaft 28 when the threaded shaft 28 moves in the second relative direction. Consequently, the second end portion P2 of each of the insertion holes 74 (74A, 74B), which is positioned in the second relative direction from the threaded shaft 28, serves as the second restriction wall W2; thereby, the movement of the threaded shaft 28 in the second relative direction may be promptly restricted. As a result, the seat 1 may secure the high rigidity for the rear side thereof.

Moreover, for example, in a case where the seat back 3 excessively moves forward, the elastic body 77 reaches a compressed limit thereof; therefore, the first end portion P1 of each of the insertion holes 74 (74A, 74B) positioned in the first relative direction from the threaded shaft 28 serves as the first restriction wall W1. As a result, the threaded shaft 28 is restricted from moving relative to each of the insertion holes 74 (74A, 74B) therewithin in the first relative direction; thereby, the seat 1 may obtain the desired rigidity for the front side thereof.

According to the third embodiment, the support bracket 70 is fixed to the side frame 11 via the stationary portions α3 and α4 at the front and rear sides of the vehicle. In each of the stationary portions α3 and α4, the first relative direction and the second relative direction are opposite from each other.

In other words, at the time of the forward and rearward movements of the seat back 3, the rotational moment acting about the substantial intermediate portion (i.e., serving as the rotation center P0) between the stationary portions α3 and α4 of the support bracket 70 relative to the side frame 11 is generated at the lower end portion 70a of the support bracket 70. Thus, according to the configuration of the third embodiment, in the first and second positions, respectively, in which the first relative direction and the second relative direction are opposite from each other, the energy generated by the forward movement of the seat back 3 may be reduced while the rearward movement of the seat back 3 may be restricted. As a result, the vibrations of the seat 1 may be appropriately reduced while the seat 1 may secure the high rigidity for the rear side thereof.

In addition, the aforementioned embodiments may be modified as follows. The vibration proof structure disclosed in each of the first, second, and third embodiments may be utilized independently or may be utilized by an arbitrary combination thereof.

Figure 15:
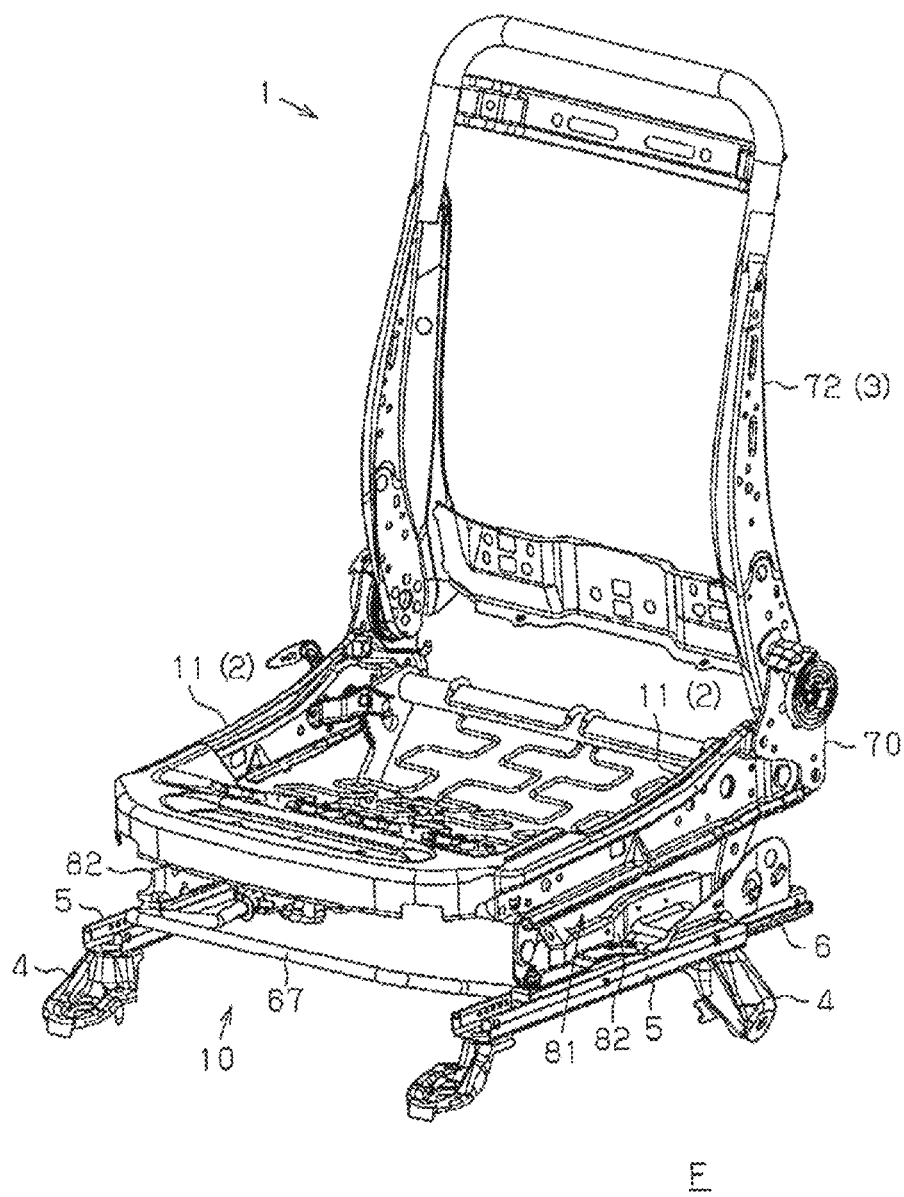
FIG. 15 is a perspective view of the seat (the seat apparatus) according another example of the embodiments disclosed here.

According to the aforementioned embodiments, a bilateral pair of side frames 11 configuring the frame of the seat cushion 2 is fixed to the upper rails 6, respectively. In the first embodiment, each of the side frames 11 configures the support member and the bottom plate portions 13 and 14 corresponding to the fixed portions of the side frame 11 configure the first members. As illustrated in FIG. 15, a member or component different from the side frame 11 is arranged between the side frame 11 and the upper rail 6. For example, in a case where the seat 1 is provided with a seat lift mechanism 81, the member or component arranged between the side frame 11 and the upper rail 6 may correspond to the support member and a fixed portion of the member or component may be configured as the first member. In addition, in an example shown in FIG. 15, a base bracket 82 of the seat lift mechanism 81 serves as the support member and a fixed portion of the base bracket 82 relative to the upper rail 6 serves as the first member.

In the first embodiment, the bolt 15 and the nut 16 are applied as the fixing members. Alternatively, for example, a rivet may be applied as the fixing member. In other words, for example, any member which includes a shaft portion penetrating through the fixed portion (the ceiling plate portion 12) of the upper rail 6 and the fixed portion (each of the bottom plate portions 13 and 14 of the side frame 11), and a pair of flanged portions arranged at the shaft portion to be in separated positions between the fixed portions, is configured to fix the fixed portion of the side frame 11 to the fixed portion of the upper rail 6 and to allow the fixed portion of the side frame 11 to move relative to the fixed portion of the upper rail 6 along the shaft portion between the flanged portions. In such case, the member may be applied as the fixing member.

Likewise, in the third embodiment, for example, a rivet may be applied as the fixing member. In other words, in a case where any member includes a shaft portion penetrating through the support bracket 70 and the side frame 11 and the shaft portion of the member is movable relative to each of the insertion holes 74 (74A, 74B) therewithin, the member may be applied as the fixing member.

Further, in the first and third embodiments, the large-diameter portion 28a is formed at the end portion of the bolt 15, which is adjacent to the bolt head 29. The large-diameter portion 28a is configured to serve as the positioning means to determine the position of the nut 16 which is to be screwed with the threaded shaft 28. Alternatively, a known positioning pin or another means may be utilized to determine the position of the nut 16.

Furthermore, in the first embodiment, the disc spring 30 is applied as the elastic member arranged together with the ceiling plate portion 12 of the upper rail 6 and the bottom plate portions 13 and 14 of the side frame 11 between the nut 16 and the bolt head 29 (of the bolt 15) that serve as the flanged portions. Alternatively, the elastic member may be arbitrarily changed. For example, a coil spring may be applied as the elastic member.

According to the first embodiment, the stationary portions α1 and α2 between the side frame 11 and the upper rail 6 are provided in the positions at the front and rear sides of the vehicle, respectively, in which the first relative direction and the second relative are opposite from each other. In addition, the single fixation structure formed by the bolt 15, the nut 16, and the disc spring 30 is provided in a position as the stationary portion α1 between the ceiling plate portion 12 of the upper rail 6 and the bottom plate portion 13 of the side frame 11 at the front side of the vehicle, and the fixation structures each formed by the bolt 15, the nut 16, and the disc spring 30 are provided in two positions as the stationary portions α2 between the ceiling plate portion 12 of the upper rail 6 and the bottom plate portion 14 of the side frame 11 at the rear side of the vehicle.

Moreover, the fixation structure according to the first embodiment may be modified as follows. The number of fixation structures each formed by the bolt 15, the nut 16, and the disc spring 30 and the number of first and second fixation structures, respectively, in which the first relative direction and the second relative direction are opposite from each other, may be arbitrarily changed. For example, the number of stationary portions α1 may be plural while the number of stationary portions α2 may one. Further, alternatively, the number of fixation structures each formed by the bolt 15, the nut 16, and the disc spring 30 may be only one. In any of the aforementioned modifications, it is obviously appropriate that the fixation structure includes the vibration proof structure according to the first embodiment, which may decrease the energy generated by the forward movement of the seat cushion 2 while restricting the rearward movement of the seat cushion 2.

Likewise, in the third embodiment, the arrangement of the fixation structure formed by the insertion hole 74 (74A, 74B) having the elongated hole shape, the threaded shaft 28 of the bolt 15 inserted in the insertion hole 74 (74A, 74B), and the elastic body 77 arranged in the insertion hole 74 (74A, 74B) may be arbitrarily changed. In addition, the number of fixation structures may be arbitrarily changed. In any of such modifications, it is obviously appropriate that the fixation structure includes the vibration proof structure according to the third embodiment, which may decrease the energy generated by the forward movement of the seat back 3 while restricting the rearward movement of the seat back 3.

According to the third embodiment, each of the insertion holes 73 (73A, 73B) of the side frame 11 includes the inner diameter substantially equal to the diameter of the large-diameter portion 28a of the threaded shaft 28. In addition, each of the insertion holes 74 (74A, 74B) of the support bracket 70 is formed to have the elongated hole shape extending in the direction in which the threaded shaft 28 moves relative to the insertion hole 74 (74A, 74B) therewithin at the time of the forward and rearward movements of the seat back 3. Alternatively, the insertion hole 74 (74A, 74B) of the support bracket 70 may be designed to include an inner diameter substantially equal to the diameter of the threaded shaft 28 while the insertion hole 73 (73A, 73B) of the side frame 11 may be formed to have an elongated hole shape extending in a direction in which the threaded shaft 28 moves relative to the insertion hole 73 (73A, 73B) therewithin at the time of the forward and rearward movements of the seat back 3. In such case, surely the elastic body 77 is provided within the insertion hole 73 (73A, 73B) including the elongated hole shape.

In addition, a material of the elastic body 77 may be arbitrarily changed. Moreover, according to the first embodiment, the disc spring 30 is arranged between the bolt 15 and the nut 16 in a manner to be compressed by the fastening force of the bolt 15 and the nut 16. Alternatively, the disc spring 30 may be arranged between the bolt 15 and the nut 16 in a manner not to be compressed.

According to the second embodiment, the support shaft 51 is biased downward by the elastic force of the spring member 61 serving as the elastic member biasing the lock lever 52 to rotate the lock lever 52. Therefore, the support shaft 51 may be biased in the second relative direction by the spring member 61 serving as the biasing portion. Instead of the spring member 61, an elastic member different from the spring member 61 may be applied as the biasing portion. In such case, the inclined surface 69 serving as the resistance force applying portion is not necessarily provided. In addition, a configuration not including the aforementioned biasing portion is applicable.

For example, even in a case where the support shaft 51 is not biased in the second relative direction by the biasing portion, the support shaft 51 is brought into slidable contact with the inclined surface 69 positioned at the rear side of the vehicle with respect to the support shaft 51 and thus a predetermined resistance force may be applied to the support shaft 51 moving in the first relative direction. Moreover, for example, the inclination of the inclined surface 69 is designed so that the support shaft 51 moves relative to the support hole 53 toward the front side of the vehicle by gravity; thereby, the support shaft 51 may be in contact with the vertical surface 68 in advance.

According to the second embodiment, each of the engagement holes 60 is configured as the engaging portion of the lock lever 52 and each of the engagement pawls 59 is configured as the engaged portion of the lower rail 5. Alternatively, the engaging portion may be formed in a convex shape and the engaged portion may be formed in a recessed shape.

According to the second embodiment, the vertical surface 68 is provided in the position that is at the front side of the vehicle with respect to the support shaft 51 within the support hole 53. The vertical surface 68 extends in the upper and lower direction and substantially in perpendicular to the front and rear direction of the vehicle. Alternatively, the vertical surface 68 may not be necessarily formed at the support hole 53 as long as the support hole 53 is designed to have a profile so as to function as the second restriction wall W2 restricting the support shaft 51 from moving in the second relative direction.

As described above, according to the aforementioned first embodiment, the vibration proof structure of the seat apparatus for the vehicle, includes the bottom plate portions 13 and 14 and the ceiling plate portion 12 movably arranged relative to each other in the first relative direction corresponding to the forward movement of the seat cushion 2 in the front and rear direction of the vehicle and in the second relative direction corresponding to the rearward movement of the seat cushion 2 in the front and rear direction of the vehicle, the seat cushion 2 being supported at an upper side of the seat apparatus, the first restriction wail W1 restricting the relative movement of each of the bottom plate portions 13 and 14 to the ceiling plate portion 12 in the first relative direction, the second restriction wall W2 restricting the relative movement of each of the bottom plate portions 13 and 14 to the ceiling plate portion 12 in the second relative direction, and the disc springs 30 applying the resistance force to the bottom plate portions 13 and 14 each moving in the first relative direction between the first restriction wall W1 and the second restriction wall W2 while not applying the resistance force to the bottom plate portions 13 and 14 each moving in the second relative direction between the first restriction wall W1 and the second restriction wall W2.

According to the aforementioned configuration, at the time of the forward movement of the seat cushion 2, the resistance force (the force disturbing the relative movement) is applied to each of the bottom plate portions 13 and 14 moving in the first relative direction corresponding to the forward movement of the seat cushion 2. Therefore, the energy generated by the forward movement of the seat cushion 2 is decreased; thereby, the vibrations of the seat 1 may be reduced. On the other hand, at the time of the rearward movement of the seat cushion 2, the specific resistance force is not applied to each of the bottom plate portions 13 and 14 moving in the second relative direction corresponding to the rearward movement of the seat cushion 2. Therefore, the movement of the seat cushion 2 in the second relative direction is promptly restricted by the second restriction wall W2 and thus the seat 1 may secure the high rigidity for the rear side thereof. In addition, in a case where the seat cushion 2 moves excessively forward, the first restriction wall W1 restricts each of the bottom plate portions 13 and 14 from moving in the first relative direction relative to the ceiling plate portion 12. As a result, the seat 1 may obtain the desired rigidity for the front side thereof.

According to the aforementioned first embodiment, the vibration proof structure further includes the side frame 11 supporting the seat cushion 2, the upper rail 6 supporting the side frame 11, and the fixation structure 15, 16, 30 fixing the side frame 11 and the upper rail 6 to each other, the fixation structure 15, 16, 30 including: the fixing members 15, 16 having the threaded shaft 28 penetrating through the ceiling plate portion 12 of the upper rail 6 and each of the bottom plate portions 13 and 14 of the side frame 11, and the pair of flanged portions 29 and 16 (the bolt head 29 and the nut 16) arranged at the threaded shaft 28 to be provided in the separated positions between which the ceiling plate portion 12 of the upper rail 6 and each of the bottom plate portions 13 and 14 of the side frame 11 are arranged, the fixing members 15, 16 allowing the relative movement in the first relative direction and in the second relative direction and fixing the ceiling plate portion 12 of the upper rail 6 to each of the bottom plate portions 13 and 14 of the side frame 11; and the disc spring 30 provided together with the ceiling plate portion 12 of the upper rail 6 and each of the bottom plate portions 13 and 14 of the side frame 11 between the pair of flanged portions 29 and 16 (the bolt head 29 and the nut 16) to bias each of the bottom plate portions 13 and 14 of the side frame 11 in the second relative direction.

In other words, the side frame 11 supporting the seat cushion 2 is fixed to and positioned on the upper rail 6 supporting the side frame 11. Accordingly, in a case where the seat cushion 2 corresponding to the seat element moves in the front and rear direction of the vehicle, the seat cushion 2 tilts in a manner that one of the rear end portion 2a and the front end portion 2b of the seat cushion 2 is moved upward and the other of the rear end portion 2a and the front end portion 2b is moved downward. Therefore, each of the bottom plate portion 13 and 14 of the side frame 11 moves relative to the upper rail 6 along the threaded shaft 28 configuring the fixing member 15, 16, in the direction where the bottom plate portion 13 or 14 of the side frame 11 comes close to the ceiling plate portion 12 of the upper rail 6 or in the direction where the bottom plate portion 13 or 14 of the side frame 11 separates from the ceiling plate portion 12 of the upper rail 6.

Thus, according to the aforementioned configuration, at the time of the forward movement of the seat cushion 2, the resistance force based on the elastic force of the disc spring 30 is applied to each of the bottom plate portions 13 and 14 of the side frame 11 moving in the first relative direction. That is, the disc spring 30 functions as the resistance force applying portion; thereby, the energy generated by the forward movement of the seat cushion 2 is decreased and the vibrations of the seat 1 may be therefore reduced.

On the other hand, at the time of the rearward movement of the seat cushion 2, the specific resistance force is not applied to each of the bottom plate portions 13 and 14 of the side frame 11 moving in the second relative direction. Therefore, the movement of the side frame 11 in the second relative direction may be promptly restricted by the flanged portions 29 and 16 (the bolt head 29 and the nut 16) configuring the second restriction walls W2. As a result, the rearward movement of the seat cushion 2 is restricted and thus the seat 1 may secure the high rigidity for the rear side thereof.

In addition, in a case where the seat cushion 2 moves excessively forward, the bottom plate portion 13 or 14 of the side frame 11 is restricted by the bolt head 29 or the nut 16 configuring the first restriction wall W1 from moving in the first relative direction relative to the upper rail 6. Therefore, the seat 1 may obtain the desired rigidity for the front side thereof.

According to the aforementioned first embodiment, the fixation structure 15, 16, 30 includes the first and second fixation structures 15, 16, 30 provided at the portions, respectively, in which the first relative direction and the second relative direction are opposite from each other.

According to the aforementioned configuration, the energy generated by the forward movement of the seat cushion 2 may be decreased while the rearward movement of the seat cushion 2 is further effectively restricted. As a result, the vibrations of the seat 1 may be appropriately reduced while the seat 1 secures the high rigidity for the rear side thereof.

According to the aforementioned second embodiment, the vibration proof structure further includes: the seat slide mechanism 10 having the lower rail 5 and the upper rail 6 which are provided relatively movable to each other in the front and rear direction of the vehicle, the seat slide mechanism 10 supporting the seat cushion 2; and the lock mechanism 50 configured to restrict the relative movement between the lower rail 5 and the upper rail 6. The lock mechanism 50 includes the support shaft 51 supported by the upper rail 6 and the lock lever 52 rotatable about the support shaft 51. The lock mechanism 50 restricts the relative movement between the lower rail 5 and the upper rail 6 by the engagement between the engagement holes 60 formed at the lock lever 52 and the engagement pawls 59 formed at the lower rail 5. The upper rail 6 includes the pair of side wall portions 45 arranged to face each other in the width direction of the upper rail 6. The support shaft 51 is arranged between and extends between the support holes 53 formed at the side wall portions 45 of the upper rail 6. Each of the support holes 53 includes the inclined surface 69 which is provided at the rear side of the vehicle with respect to the support shaft 51 to be inclined relative to the front and rear direction of the vehicle. The support hole 53 is formed to allow the relative movement of the support shaft 51 to the support hole 53 therewithin in the front and rear direction of the vehicle.

According to the aforementioned configuration, at the time of the forward movement of the seat cushion 2, the support shaft 51 apparently moves relative to the support hole 53 therewithin toward the rear side of the vehicle. In addition, the support shaft 51 moves relative to the support hole 53 therewithin so as to slide on the inclined surface 69 provided at the rear side of the vehicle with respect to the support shaft 51. Therefore, the support shaft 51 receives the resistance force while moving in the first relative direction that corresponds to the forward movement of the seat cushion 2. That is, the inclined surface 69 functions as the resistance force applying portion; thereby, the energy generated by the forward movement of the seat cushion 2 serving as the seat element is decreased and thus the vibrations of the seat 1 may be reduced.

Meanwhile, at the time of the rearward movement of the seat cushion 2, the support shaft 51 apparently moves relative to the support hole 53 therewithin toward the front side of the vehicle. At this time, the specific resistance force is not applied to the support shaft 51 moving in the second relative direction corresponding to the rearward movement of the seat cushion 2. Accordingly, the inner surface of the support hole 53, which is positioned at the front side of the vehicle with respect to the support shaft 51, functions as the second restriction wall W2 to thereby promptly restrict the movement of the support shaft 51 in the second relative direction. As a result, the rearward movement of the seat cushion 2 is restricted and thus the seat 1 may secure the high rigidity for the rear side thereof. Moreover, in a case where the seat cushion 2 moves excessively forward, the inner surface of the support hole 53, which includes the inclined surface 69 and which is positioned at the rear side of the vehicle with respect to the support shaft 51, functions as the first restriction wall W1. Therefore, the support shaft 51 is restricted from moving in the first relative direction relative to the support hole 53 and thus the seat 1 may secure the desired rigidity for the front side thereof.

According to the aforementioned second embodiment, the vibration proof structure further includes the spring member 61 configured to bias the support shaft 51 in the second relative direction.

According to the aforementioned configuration, the resistance force based on the elastic force of the spring member 61 may be applied to the support shaft 51 moving in the first relative direction. That is, the spring member 61 may also function as the resistance force applying portion. In addition, the support shaft 51 may be brought in advance in contact with the inner surface that is positioned at the front side of the vehicle with respect to the support shaft 51 to configure the second restriction wall W2. Therefore, the rearward movement of the seat cushion 2 may be promptly restricted and the seat 1 may therefore secure the high rigidity for the rear side thereof.

According to the aforementioned third embodiment, the vibration proof structure further includes the support bracket 70 supporting the seat back 3, the side frame 11 configuring the frame of the seat cushion 2, and the fixing member 15, 16 including the threaded shaft 28 penetrating through the support bracket 70 and the side frame 11, the fixing member 15, 16 fixing the support bracket 70 to the side surface 11s of the side frame 11. The insertion hole 74 in which the threaded shaft 28 is relatively movably inserted in the first relative direction and the second relative direction is formed at one of the side frame 11 and the support bracket 70. The elastic body 77 is arranged within the insertion hole 74 to be positioned between the threaded shaft 28 and the insertion hole 74, the elastic body 77 being compressed by the relative movement of the threaded shaft 28 to the insertion hole 74 therewithin in the first relative direction to exert the resistance force.

According to the aforementioned configuration, at the time of the forward movement of the seat back 3 corresponding to the seat element, the threaded shaft 28 of the bolt 15 moves in the first relative direction within the insertion hole 74 while compressing the elastic body 77 arranged within the insertion hole 74. In addition, the resistance force is applied to the threaded shaft 28 moving in the first relative direction, on the basis of the elastic force of the elastic body 77. That is, the elastic body 77 functions as the resistance force applying portion; thereby, the energy generated by the forward movement of the seat back 3 serving as the seat element is decreased and thus the vibrations of the seat 1 may be reduced.

On the other hand, at the time of the rearward movement of the seat back 3, the threaded shaft 28 moves in the second relative direction within the insertion hole 74. At this time, the elastic body 77 is not compressed; therefore, the specific resistance force is not applied to the threaded shaft 28 when the threaded shaft 28 moves in the second relative direction corresponding to the rearward movement of the seat back 3. Consequently, the inner surface of the insertion hole 74, which is positioned in the second relative direction from the threaded shaft 28, serves as the second restriction wall W2; thereby, the movement of the threaded shaft 28 in the second relative direction is promptly restricted. As a result, the rearward movement of the seat back 3 is restricted; thereby, the seat 1 may secure the high rigidity for the rear side thereof.

In addition, in a case where the seat back 3 moves excessively forward, the elastic body 77 reaches the compressed limit thereof; therefore, the inner surface of the insertion hole 74, which is positioned in the first relative direction from the threaded shaft 28, serves as the first restriction wall W1. As a result, the threaded shaft 28 is restricted from moving in the first relative direction relative to the insertion hole 74; thereby, the seat 1 may obtain the desired rigidity for the front side thereof.

According to the aforementioned third embodiment, the support bracket 70 and the side frame 11 are fixed to each other via the first and second positions, respectively, in which the first relative direction and the second relative direction are opposite from each other.

According to the aforementioned configuration, the energy generated by the forward movement of the seat back 3 may be reduced while the rearward movement of the seat back 3 is further effectively restricted. As a result, the vibrations of the seat 1 may be appropriately reduced while the seat 1 may secure the high rigidity for the rear side thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vibration proof structure of a seat apparatus for a vehicle, comprising:
    a first member and a second member movably arranged relative to each other in a first relative direction corresponding to a forward movement of a seat element in a front and rear direction of the vehicle and in a second relative direction corresponding to a rearward movement of the seat element in the front and rear direction of the vehicle, the seat element being supported at an upper side of the seat apparatus;
    a first restriction wall restricting a relative movement of the first member to the second member in the first relative direction;
    a second restriction wall restricting the relative movement of the first member to the second member in the second relative direction; and
    a resistance force applying portion applying a resistance force to the first member moving in the first relative direction between the first restriction wall and the second restriction wall while not applying the resistance force to the first member moving in the second relative direction between the first restriction wall and the second restriction wall.

2. The vibration proof structure according to claim 1, further comprising:
    a support member supporting a seat cushion;
    a rail member supporting the support member; and
    a fixation structure fixing the support member and the rail member to each other,
    the fixation structure comprising:
        a fixing member including a shaft portion penetrating through a fixed portion of the rail member and a fixed portion of the support member, and a pair of flanged portions arranged at the shaft portion to be provided in separated positions between which the fixed portion of the rail member and the fixed portion of the support member are arranged, the fixing member allowing the relative movement in the first relative direction and in the second relative direction and fixing the fixed portion of the rail member to the fixed portion of the support member; and
        an elastic member provided together with the fixed portion of the rail member and the fixed portion of the support member between the pair of flanged portions to bias the fixed portion of the support member in the second relative direction.

3. The vibration proof structure according to claim 2, wherein the fixation structure includes first and second fixation structures provided at portions, respectively, in which the first relative direction and the second relative direction are opposite from each other.

4. The vibration proof structure according to claim 1, further comprising:
    a seat slide mechanism including a lower rail and an upper rail which are provided relatively movable to each other in the front and rear direction of the vehicle, the seat slide mechanism supporting a seat cushion; and
    a lock mechanism configured to restrict a relative movement between the lower rail and the upper rail,
    the lock mechanism including a support shaft supported by the upper rail and a lock lever rotatable about the support shaft, the lock mechanism restricting the relative movement between the lower rail and the upper rail by engagement between an engaging portion formed at the lock lever and an engaged portion formed at the lower rail,
    the upper rail including a pair of side wall portions arranged to face each other in a width direction of the upper rail,
    the support shaft arranged between and extending between support holes formed at the side wall portions of the upper rail,
    each of the support holes including an inclined surface which is provided at a rear side of the vehicle with respect to the support shaft to be inclined relative to the front and rear direction of the vehicle, the support hole being formed to allow a relative movement of the support shaft to the support hole therewithin in the front and rear direction of the vehicle.

5. The vibration proof structure according to claim 4, further comprising a biasing portion configured to bias the support shaft in the second relative direction.

6. The vibration proof structure according to claim 1, further comprising:
    a support bracket supporting a seat back;
    a side frame configuring a frame of a seat cushion; and
    a fixing member including a shaft portion penetrating through the support bracket and the side frame, the fixing member fixing the support bracket to a side surface of the side frame, wherein an insertion hole in which the shaft portion is relatively movably inserted in the first relative direction and the second relative direction is formed at one of the side frame and the support bracket, and
    wherein an elastic body is arranged within the insertion hole to be positioned between the shaft portion and the insertion hole, the elastic body being compressed by a relative movement of the shaft portion to the insertion hole therewithin in the first relative direction to exert the resistance force.

7. The vibration proof structure according to claim 6, wherein the support bracket and the side frame are fixed to each other via first and second positions, respectively, in which the first relative direction and the second relative direction are opposite from each other.

* * * * *